(12) United States Patent
Hill et al.

(10) Patent No.: US 10,538,973 B2
(45) Date of Patent: Jan. 21, 2020

(54) OFFSET FLANGE AND ANGLED SHIM FLOWLINE FITTINGS

(71) Applicant: KHOLLE Magnolia 2015, LLC, Houston, TX (US)

(72) Inventors: Larry Mitchel Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 372 days.

(21) Appl. No.: 15/399,102

(22) Filed: Jan. 5, 2017

(65) Prior Publication Data

US 2018/0187507 A1 Jul. 5, 2018

(51) Int. Cl.
*E21B 17/04* (2006.01)
*E21B 33/068* (2006.01)
(Continued)

(52) U.S. Cl.
CPC .......... *E21B 17/04* (2013.01); *B65D 19/0004* (2013.01); *B65D 19/385* (2013.01); *E21B 17/042* (2013.01); *E21B 33/068* (2013.01); *E21B 43/26* (2013.01); *F16L 23/02* (2013.01); *F16L 23/12* (2013.01); *F16L 41/008* (2013.01); *F16L 41/02* (2013.01); *F16L 41/03* (2013.01);
(Continued)

(58) Field of Classification Search
CPC ...................................................... E21B 17/04; E21B 43/26; F16L 23/02; F16L 23/032; F16L 23/12; F16L 41/008; F16L 41/02; F16L 41/03; F16L 41/04; F16L 41/088
See application file for complete search history.

(56) References Cited

U.S. PATENT DOCUMENTS 6,302,141 B1 10/2001 Markulec et al.
6,575,247 B2 * 6/2003 Tolman ................. E21B 33/068
166/305.1

(Continued)

OTHER PUBLICATIONS

AGR Field Operations, *Laser Video Inspection* (undated).
(Continued)

*Primary Examiner* — Kristyn A Hall
*Assistant Examiner* — Tara E Schimpf
(74) *Attorney, Agent, or Firm* — Keith B. Willhelm

(57) ABSTRACT

Flowline components are assembled into high-pressure fluid transportation systems by a flange union. The flowline component comprises a body defining a substantially cylindrical central conduit. The conduit extends between first and second flat union faces and is adapted to conduct fluids through the body. The union faces are adapted to provide a mating surface for a flange union between the component and another flowline component. Accordingly, the union faces have a plurality of holes adapted to accommodate threaded connectors for forming the flange union. The holes are arranged in a defined array extending angularly around the conduit. Importantly, the array of holes on the first union face and the array of holes on the second union face are offset angularly relative to each other by an angle Δ. It will be appreciated that such components may allow changes in the direction of a flow line.

29 Claims, 15 Drawing Sheets

(51) Int. Cl.
*E21B 43/26* (2006.01)
*E21B 17/042* (2006.01)
*B65D 19/00* (2006.01)
*B65D 19/38* (2006.01)
*F16L 23/12* (2006.01)
*F16L 41/03* (2006.01)
*F16L 41/02* (2006.01)
*F16L 23/02* (2006.01)
*F16L 41/00* (2006.01)
*F16L 41/08* (2006.01)
*F16L 41/04* (2006.01)

(52) U.S. Cl.
CPC .............. *F16L 41/04* (2013.01); *F16L 41/088* (2013.01); *B65D 2519/00233* (2013.01); *B65D 2519/00273* (2013.01); *B65D 2585/6897* (2013.01)

(56) References Cited

U.S. PATENT DOCUMENTS

| | | | |
|---|---|---|---|
| 6,874,538 | B2 | 4/2005 | Bennett |
| 7,686,041 | B2 | 3/2010 | Eidsmore et al. |
| 8,376,046 | B2 | 2/2013 | Broussard, II |
| 8,469,108 | B2 | 6/2013 | Kajaria et al. |
| 8,656,990 | B2 | 2/2014 | Kajaria et al. |
| 8,813,836 | B2 | 8/2014 | Kajaria et al. |
| 8,950,433 | B2 | 2/2015 | Manofsky et al. |
| 8,978,763 | B2 | 3/2015 | Guidry |
| 9,127,545 | B2 | 9/2015 | Kajaria et al. |
| 2007/0114039 | A1 | 5/2007 | Hobdy et al. |
| 2010/0300672 | A1 | 12/2010 | Childress et al. |
| 2011/0048695 | A1 | 3/2011 | Cherewyk et al. |
| 2012/0181030 | A1* | 7/2012 | Kajaria ............... E21B 43/26 166/308.1 |
| 2015/0000766 | A1 | 1/2015 | Arizpe et al. |
| 2015/0184491 | A1 | 7/2015 | Kajaria et al. |
| 2015/0292297 | A1* | 10/2015 | Kajaria ............... E21B 34/02 166/250.01 |
| 2016/0060997 | A1* | 3/2016 | Thomas ............... E21B 43/267 166/88.4 |
| 2016/0115773 | A1 | 4/2016 | Conrad et al. |

OTHER PUBLICATIONS

Belzona Polymerics Limited, *Next Generation Coatings for Erosion-Corrosion Protection* (undated).

Cameron, *Frac Manifold Systems—Increase Operational Efficiencies of Simultaneous Completion Operations* (© 2016 Schlumberger).

Cameron, *Monoline Flanged-Connection Fracturing Fluid Delivery Technology* (© 2016 Schlumberger).

Pipelines International, *The Ultimate Guide to Unpiggable Pipelines* (undated).

Forum Energy Technologies, *Smart Solutions. Powerful Products.* (undated—print date Jan. 2018) (with undated photos).

* cited by examiner

OFFSET FLANGE AND ANGLED SHIM FLOWLINE FITTINGS

FIELD OF THE INVENTION

The present invention relates generally to fluid transportation systems and flow lines used in those systems, and especially to flow lines and flow line components used to convey abrasive, corrosive fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer, and thus, the porous layer forms an area or reservoir in which hydrocarbons will collect. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

When the drill bit has reached the desired depth, larger diameter pipes, or casings, are placed in the well and cemented in place to prevent the sides of the borehole from caving in. Cement is introduced through a work string. As it flows out the bottom of the work string, fluids already in the well, so-called "returns," are displaced up the annulus between the casing and the borehole and are collected at the surface.

Once the casing is cemented in place, it is perforated at the level of the oil-bearing formation to create openings through which oil can enter the cased well. Production tubing, valves, and other equipment are installed in the well so that the hydrocarbons may flow in a controlled manner from the formation, into the cased well bore, and through the production tubing up to the surface for storage or transport.

This simplified drilling and completion process, however, is rarely possible in the real world. Hydrocarbon bearing formations may be quite deep or otherwise difficult to access. Thus, many wells today are drilled in stages. An initial section is drilled, cased, and cemented. Drilling then proceeds with a somewhat smaller well bore which is lined with somewhat smaller casings or "liners." The liner is suspended from the original or "host" casing by an anchor or "hanger." A seal also is typically established between the liner and the casing and, like the original casing, the liner is cemented in the well. That process then may be repeated to further extend the well and install additional liners. In essence, then, a modern oil well typically includes a number of tubes telescoped wholly or partially within other tubes.

Moreover, hydrocarbons are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

One technique involves drilling a well in a more or less horizontal direction, so that the borehole extends along a formation instead of passing through it. More of the formation is exposed to the borehole, and the average distance hydrocarbons must flow to reach the well is decreased. Another technique involves creating fractures in a formation which will allow hydrocarbons to flow more easily. Indeed, the combination of horizontal drilling and fracturing, or "frac'ing" or "fracking" as it is known in the industry, is presently the only commercially viable way of producing natural gas from the vast majority of North American gas reserves.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is injected into the formation, fracturing it and creating flow paths to the well. The proppant serves to prevent fractures from closing when pumping is stopped.

A formation typically will be fractured in many different locations or zones, but rarely, if ever, will it be fractured all at once. A liner first will be installed in the well. The liner will incorporate valves, or the liner may be perforated in a first zone near the bottom of the well. Fluids then are pumped into the well to fracture the formation in the vicinity of the bottom perforations. After the initial zone is fractured, a plug is installed in the liner at a point above the fractured zone. The liner is perforated again, this time in a second zone located above the plug. That process is repeated for zones further up the formation until the formation has been completely fractured.

Once the well is fractured, the large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The larger units of a frac system are transported to a well site on skid, trailers, or trucks and then connected by one kind of conduit or another. The conduits on the low-pressure side typically will be flexible hoses, such as blender hoses 7 and suction hoses 11. On the other hand, flow lines 14 running to goat head 15 and other high-pressure side conduits will be subject to extremely high pressures. They must be more rugged. They also typically will be assembled on site.

Flow lines 14 and other portions of the high-side that are assembled on site are made up from a variety of components often referred to as "frac iron," "flow iron," or "ground iron." Such components include sections of straight steel pipe, such as pup joints. Also included are various fittings which provide junctions at which flow through conduits is split or combined, such as tees, crosses, laterals, and wyes. In addition to junction fittings, flow line components include fittings which are used to alter the course of a flow line. Such directional fittings include elbows and swivel joints. High-pressure flow lines also incorporate gauges and other monitoring equipment, as well as control devices such as shut off, plug, check, throttle, pressure release, butterfly, and choke valves.

Because frac systems are required at a site for a relatively short period of time, frac iron components are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Flange unions, at least in comparison to threaded connections, may be made up and broken down with relative ease. Their basic design is robust and reliable, and like other flowline components, they are fabricated from heavy, high tensile steel. Thus, they have been adapted for low pressure (1,000 to 2,000 psi), medium pressure (2,000 to 4,000 psi), and high pressure service (6,000 to 20,000 psi). Moreover, unlike hammer and clamp unions, flange unions do not rely on seals that are exposed to fluids passing through the union.

Flange unions, as their name implies, typically provide a connection between two flanged components, such as spooled pipe or simply "spools." Spooled pipe is provided with annular flanges extending radially outward from each end, thus giving the pipe the appearance of a spool. The flanges provide flat surfaces or faces which allow two spools to mate at their flanges. The flanges also are provided with a number of bolt holes. The holes are arranged angularly around the flange. Thus, spooled pipes may be connected by bolting mating flanges together. Each flange will have an annular groove running concentrically around the pipe opening. An annular metal seal is carried in the grooves to provide a seal between the flanges.

Though not entirely apparent from the schematic representation of FIG. 1, it will be appreciated that conventional frac systems are assembled from a very large number of individual components. Assembly of so many units on site can be time consuming, expensive, and hazardous. Thus, some components of a frac system are assembled off site on skids or trailers and transported as a unit to the well site.

Commonly skidded units include not only process units, such as blender 6 and pumps 10, but also flow units. Frac manifold 9, for example, is an assembly of pipes, junctions, valves, and other flow line components that typically are assembled off-site. Collectively, they provide a flow unit that manifolds, distributes, and controls discharge from pumps 10. Zipper manifold 16 is another flow unit that at times is assembled off-site from separate flow line components. Zipper manifold 16 receives flow from flow lines 14 and selectively distributes it to multiple well heads 17.

Such units may have been assembled on site in the past. By skidding them, assembly time at the well site is greatly reduced. Moreover, the components typically may be assembled more efficiently and reliably, and may be tested more easily in an off-site facility. At the same time, however, a well head is fixed. Skidded units can be quite large, heavy, and moveable only with difficulty and limited precision. Flow lines, therefore, necessarily incorporate directional fittings, such as elbows and swivel joints, which allow its course to be altered to accommodate two unaligned units.

Elbow joints are simply curved sections of pipe which provide, for example, a 90° turn in a line. Swivel joints are elbow connections having one or more joints in the conduit. The joints are packed with beatings which allow portions of the conduit to rotate relative to each other, thus allowing swivel joints to accommodate varying alignments between the components which they connect. Accordingly, swivel joints can provide considerable flexibility in assembling a flow line between essentially immovable points.

Though much less common, swivel flanges also are used to provide similar flexibility. Swivel flanges have a flange mounted on a hub. The hub is formed, for example, at one end of a length of pipe. Bearings are packed around the hub, and the flange can rotate around the hub on the bearings. When joined together, a pair of swivel-flanged pipes and a pair of elbow joints, like swivel joints, can accommodate varying alignments between components to be joined. Consequently, it is rare, if ever, that the high-side of a frac system does not incorporate at least one or, more likely, multiple swivel joints or flanges.

The large number of individual components in a frac system is compounded by the fact that most conventional frac systems incorporate a large number of relatively small flow lines, typically 3" and 4" flow lines. In part that is unavoidable. The pumps cannot be deployed in series and the flow lines carrying their individual discharges must be manifolded. Likewise, if multiple wells are to be serviced by the same array of pumps without assembling and disassembling flow lines, at some point their collective discharge must be split or directed into different flowline segments.

On the other hand, multiple flow lines in many instances represent a design choice. That is, certain flow rates and pressures will be required to fracture a particular well. Those flow rates and pressures will determine the number and capacities of the pumps. The high-pressure side then is designed to deliver the required flow rate without exceeding a maximum or "erosional" flow velocity, typically about 40'/sec, through the system. Additional flow lines often are added to provide higher flow rates into a well. The net result is that a fracking system often is so complicated that it resembles to the uninitiated a tangled mass of spaghetti.

Efforts have been made to simplify the flow line by incorporating fewer segments. For example, the conventional frac system illustrated in FIG. 1 includes four flow lines 14 running from the high-pressure lines 13 of frac manifold 9 to goat head 15. Some frac systems now employ a single, larger flowline segment running in place of four smaller lines. A single larger flow line will incorporate fewer parts and, therefore, fewer potential leak points. Both in terms of direct material and labor costs, a single larger flow line often will be less expensive than multiple smaller lines.

Frac jobs, however, have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville in northeast Texas and northwest Louisiana require pressures around 13,500 psi. Pumping may continue near continuously—at flow rates of 2 to 3 thousand gallons per minute (gpm) for several days before fracturing is complete.

Moreover, at least in the early stages of production, the flow back after fracturing also will be at high pressure and flow rates. The initial production stream from a fractured well flows at pressures in the range of from 3,000 to 5,000 psi, and more and more commonly up to 10,000 psi. The flow rates can approach a million cubic feet per hour or more.

Given the high number of components, leaking at unions is always a concern in frac systems. The unions may not always be assembled properly. Even when assembled to specification, however, such issues are exacerbated by the extremely high pressures and flow rates through the system. Many unions also incorporate elastomeric seals which are exposed to flow through the conduit and are particularly susceptible to leaking.

Moreover, the abrasive and corrosive nature of the slurry flowing through a frac system not only will accelerate deterioration of exposed elastomeric seals, it can rapidly erode and weaken conduit walls. Flow through relatively long straight sections of pipe is relatively laminar. Flow through other areas, however, such as unions where exposed seals often are present, may be quite turbulent. Erosion also is a more significant issue where a flow line changes directions. Flow will more directly impact conduit walls, causing more abrasion than that caused simply by fluid passing over the walls.

High pressures and flow rates also create vibrations through a flow line. Those vibrations create stress throughout the flow line, but especially at the unions. The resulting strain may create fracturing which may propagate and lead to catastrophic failure. In any event, fracturing renders the conduit more susceptible to erosion, corrosion, and fatigue.

Such issues may be addressed in part by conventional approaches such as skidding units and providing equivalent flow rates with fewer, larger conduits. The components in skidded units, in general, may be assembled closer to specifications more precisely. Moreover, skidded components typically are welded or otherwise anchored to the skid, and that can reduce vibrational stress on the components. Single lines also reduce the overall number of components, and therefore, the number of potential leak paths. Many components, however, are not skidded, and even relatively larger lines still experience such problems. In particular, even relatively large flow lines still invariably incorporate swivel joints or flanges and may have other relatively sharp changes in direction.

Flowline components also are quite expensive. Swivel joints and swivel flanges in particular are expensive and often comprise the single largest part expense of a high-side flow line. At the same time, the general issues discussed above seem to be more focused in respect to swivel joints and swivel flanges. Swivel joints often incorporate exposed elastomeric seals. Flow through swivel joints is relatively turbulent. Because they incorporate rotatable joints and connect unaligned components, swivel joints and swivel flanges are particularly susceptible to bending stress caused by vibration in the flow line. They also may be disassembled on site for service and may not always be reassembled to specification.

Any failure of flowline components on site may interrupt fracturing, potentially reducing its effectiveness and inevitably increasing the amount of time required to complete the operation. Catastrophic failure may endanger service personnel. Thus, flowline components must be certified and periodically recertified as complying with rated specifications. The harsh operating conditions to which they are exposed, however, may cause damage or weakening of the components which is difficult to detect, such as fatigue stress and microscopic fracturing. Thus, flow iron typically must be inspected off-site.

It also will be appreciated that, especially on the high-pressure side of the system, if a connection fails, large quantities of fluid can be ejected at very high pressures, causing the components to move violently and potentially injure workers. Thus, various restraint systems are employed to restrict movement of components in the event a connection fails. The most common form of restraint system uses strips or belts of fabric, usually incorporating Kevlar or other high strength fibers. The fabric belts are wound around both sides of the connection. If the connection fails, the wound fabric will restrict movement of the formerly connected components.

Finally, the cost of repeatedly recertifying or replacing components can add significantly to operating costs of the system. Thus, high-pressure flowline components are required to endure extremely abrasive fluids flowing at extremely high pressures and rates and, hopefully, to do so over an extended service life.

The statements in this section are intended to provide background information related to the invention disclosed and claimed herein. Such information may or may not constitute prior art. It will be appreciated from the foregoing, however, that there remains a need for new and improved high-pressure flowline unions and methods for connecting flowline components. Such disadvantages and others inherent in the prior art are addressed by various aspects and embodiments of the subject invention.

SUMMARY OF THE INVENTION

The subject invention, in its various aspects and embodiments, relates generally to fluid transportation systems and flow lines used in those systems and encompasses various embodiments and aspects, some of which are specifically described and illustrated herein. One aspect of the invention provides for a flowline component which is adapted for assembly into a high-pressure fluid transportation system by a flange union. The flowline component comprises a body defining a substantially cylindrical central conduit. The conduit extends between first and second union faces and is adapted to conduct fluids through the body. The union faces are adapted to provide a mating surface for a flange union between the component and another flowline component. Accordingly, the union faces have a plurality of holes adapted to accommodate threaded connectors for forming the flange union. The holes are arranged in a defined array extending angularly around the conduit. Importantly, the array of holes on the first union face and the array of holes on the second union face are offset angularly relative to each other by an angle $\Delta$. It will be appreciated that such components may allow changes in the direction of a flow line. They may be block fittings or flanged components.

In some embodiments the arrays of holes may comprise 16 holes spaced angularly at 22.5° and the offset angle $\Delta$ may be 11.25° or 7.5°. In other embodiments arrays of holes comprise 12 holes spaced angularly at 30° and the offset angle $\Delta$ may be 15° or 10°. In still other embodiments the arrays of holes comprise 8 holes spaced angularly at 45° and the offset angle $\Delta$ may be 22.5° or 15°.

Other aspects of the invention provide flow lines for a fluid transportation system, especially those adapted for high pressures and temporary installation, which incorporate such offset components. The offset components are assembled into the flow line by flange unions. Yet other embodiments provide fluid transportation systems incorporating such flow lines. Especially preferred aspects and embodiments of the subject invention include frac systems comprising a plurality of pumping units, a well head, and a single such flow line. Each of the pumps have discharge lines which are connected to the single flow line. The single flow line is connected to the well head. Thus, all fluid discharged from the pumps is conveyed by the single flow line to the well head. In other embodiments the well head may comprise a zipper manifold.

Another aspect provides methods of assembling a flow line for a fluid transportation system, especially those adapted for high pressures and temporary installation. The offset flowline components are assembled into the flow line by connecting the offset flowline component to other flowline components by a flange union.

Yet other aspects and embodiments provide a directional flowline fitting. The fitting is adapted for assembly into a flowline segment running between two junctions in a fluid transportation system, especially systems adapted for high pressures and temporary installation. The flowline fitting provides a change of direction in the segment and comprises a prismatic body. The body has a single conduit therein consisting of first and second intersecting straight line bores. The bores extend, preferably perpendicularly, from a first union face and a second union face on the body. The union faces are adapted for connection to a flowline component by a flange union. The extended planes of the first and second union faces intersect at an angle $\theta$ less than approximately 90°.

In certain aspects the body is a truncated solid rectangle. Preferred embodiments of such directional fittings include fittings where the angle $\theta$ is approximately 45° or is approximately 60°.

Other aspects of the invention provide flow line segments for a fluid transportation system, especially those adapted for high pressures and temporary installation. The flowline segments run between two flowline junctions and incorporate the angled directional fittings. The directional fittings are assembled into the flowline segment by flange unions. Yet other embodiments provide fluid transportation systems incorporating such flowline segments.

Especially preferred aspects and embodiments of the subject invention include frac systems comprising a plurality of pumping units, a well head, and a single flow line including the flowline segments. Each of the pumps have discharge lines which are connected to the single flow line. The single flow line is connected to the well head. Thus, all fluid discharged from the pumps is conveyed by the single flow line to the well head. In other embodiments the well head may comprise a zipper manifold.

Other preferred aspects and embodiments include flowline segments, flow lines, and fluid transportation systems incorporating the novel angled directional fittings which do not incorporate swivel joints.

Another aspect provides methods of assembling a flow line for a fluid transportation system, especially those adapted for high pressures and temporary installation. The angled directional fittings are assembled into the flow line by connecting the fittings to other flowline components by a flange union.

The subject invention also includes flow lines, especially those adapted for high pressures and temporary installation, which manifolds the discharge from a plurality of pumps. The flowline comprises at least two junction fittings. The junction fittings comprise a prismatic body having a primary bore and at least two feed bores. The primary bore extends axially through the body between first and second primary union faces. The primary union faces are adapted for connection to a flowline component by a flange union. The feed bores extend radially through the body from a feed union face to an intersection with the primary bore. The feed union face is adapted for connection to a flowline component by a flange union. The intersections of the feed bores are offset axially from each other along the primary bore. The junction fittings are joined by flange unions to at least one spooled pipe. The junction fittings and spooled pipe thereby form a flow line including the primary bores. A discharge line from a pump is joined to each feed union face of the junction fittings by a flange union. Thus, the discharge from the pumps is manifolded into the flow line.

Other such embodiments include those where the feed bores intersect with the primary bore at right angles. Still other aspects are directed to such junction fittings where the feed bores intersect with the primary bore at an interior angle of less than 90°, where the intersection between the feed bores and the primary bore is approximately 45°, and where the feed bores intersect with the primary bore at an interior angle of from about 30° to about 60°.

Yet other aspects and embodiments include such flow lines where the flow line is mounted on a skid or a trailer for transportation to a site. Still other embodiments are directed to fluid transportation systems incorporation such flow lines. Yet other aspects include methods for assembling fluid transportation systems, especially those adapted for high pressures and for temporary installation. The method comprises assembling such flow lines into the system by connecting the flow line to a flowline component by a flange union.

Still other aspects and embodiments of the subject invention include junction fittings adapted to manifold the discharge from a plurality of pumps. The junction fittings may be incorporated into a fluid transportation system, especially such systems adapted for high pressures and for temporary installation. The junction fittings comprise a prismatic body having a straight-line primary bore and at least two straight-line feed bores. The primary bore extends axially through the body between first and second primary union faces adapted for connection to a flowline component by a flange union. The primary bore then will comprise part of the flow line. The feed bores extend through the body from a feed union face to an intersection with the primary bore. The feed union face is adapted for connection to a component of a discharge line from a the frac pump by a flange union. The feed bores thus will manifold the discharged from the pumps into the primary bore and flow line. Preferably, the intersection between the feed bores and the primary bore has an interior angle of less than 90° and the intersections of the feed bores are offset axially from each other. Other preferred embodiments include junction fittings where the intersection between the feed bores and the primary bore is approximately 45° and where the feed bores intersect with the primary bore at an interior angle of from about 30° to about 60°.

Yet other aspects and embodiments include flow lines incorporating the junction fittings. The junction fittings are assembled into the flow line by connecting the junction flowline component to other flowline components by a flange union. The junction fitting is connected at the feed union faces to discharge lines from two pumps by flange union, Additional embodiments include those where the flow line is mounted on a skid or a trailer for transportation to a site. Still other embodiments are directed to fluid transportation systems incorporation such fittings and flow lines. Yet other aspects include methods for assembling fluid transportation system, especially those adapted for high pressures and for temporary installation. The method comprises assembling such fittings and flow lines into the system by connecting the fittings and flow line to a flowline component by a flange union.

Other embodiments and aspects of the subject invention are directed to flowline components for fluid transportation systems, especially those adapted for high pressures and temporary installations. The components are adapted for connection by a flange union and incorporate wear sleeves. The components comprise a body defining a substantially cylindrical central conduit extending between first and second union faces. The conduit is adapted to conduct fluids through the body. The union faces are adapted to provide a mating surface for a flange union between the component and another flowline component. The wear sleeve is mounted in the conduit and extends beyond at least one of the union faces. The components may be block fittings or flanged components, such as a spooled pipe.

Yet other embodiments are directed to flow lines for fluid transportation systems which comprise such flowline components. The components are assembled into the flow line by flange unions. Additional aspects include fluid transportation systems which comprise such flow lines. Especially preferred embodiments include frac systems which comprise a plurality of pumping units, a well head, and a single such flow line. Each pump has a discharge line, all of which are connected to the single flow line. The single flow line is connected to the well head. Thus, all fluid discharged from the pumps is conveyed by the single flow line to the well head.

Other related aspects and embodiments include flange unions for components of a flow line. The union comprises a sub of a first component and a sub of a second component. The first and second components have central conduits extending through the subs. The subs have a union face adapted to provide a mating surface for the flange union formed by the subs. A wear sleeve is mounted in the central conduits of the first and second components and extends through the flange union.

Still other embodiments are directed to flow lines for fluid transportation systems which comprise such unions. Additional aspects include fluid transportations systems which comprise such flow lines. Especially preferred embodiments include frac systems which comprise a plurality of pumping units, a well head, and a single such flow line. Each pump has a discharge line, all of which are connected to the single flow line. The single flow line is connected to the well head. Thus, all fluid discharged from the pumps is conveyed by the single flow lien to the well head.

Still other aspects are directed to flow lines incorporating one or more of the novel offset components, the novel angled directional fittings, the novel flowline segments, the novel flowline junctions, and flowline components having wear sleeves. The novel flow lines may incorporate differing combinations of such novel features and embodiments.

The subject invention, in its various aspects and embodiments, also relates generally to skids for mounting flowline subassemblies for fluid transportation systems and encompasses various embodiments and aspects, some of which are specifically described and illustrated herein. One aspect of the invention provides for a skid for a fluid transportation system, especially systems adapted for high pressures and for temporary installations. The skid comprises a base, a carriage, linear actuators, and a restraining cage. The carriage is adapted to receive a subassembly of the system. The carriage comprises one or more bearing surfaces. The bearing surfaces are adapted to allow the subassembly to slide across the carriage along intersecting horizontal axes. One or more of the linear actuators are coupled between the base and the carriage. The actuators are actuatable to move the carriage along a vertical axis. The cage comprises frame members adapted to extend around the subassembly. The frame members comprise a pair of vertical frame members interconnected at their ends by a horizontal frame member. Thus, the subassembly may be positioned for assembly into the system. Other embodiments include such skids which also comprise a plurality of linear actuators which are actuatable to level the carriage.

Additional preferred embodiments include skid having a lift. The lift comprises a bearing support, one or more bearing tracks, and one or more linear actuators. The bearing tracks are mounted on the bearing support and are adapted to support the subassembly for rotation. The linear actuators are coupled between the carriage and the base. The actuators are actuatable to move the lift from a first, lower position to a second raised position. In the first, lower position the subassembly is not supported on the bearing tracks. In the second, raised position the subassembly may be rotated on the bearing tracks.

Still other aspects are directed to modular skids where the base is adapted for connection to the base of another skid and to skids where the vertical members extend from the base. Additional embodiments are directed to fluid transportation systems, especially those adapted for high pressures and for temporary installation. The systems comprise one or more subassemblies supported on the novel skids. Especially preferred systems are frac systems which comprise a plurality of pumping units, a well head, and a single flow line. Each pump has a discharge line, all of which are connected to the single flow line. The single flow line is connected to the well head. Thus, all fluid discharged from the pumps is conveyed by the single flow line to the well head.

The subject invention also is directed in other aspects to methods of assembling a flow line and fluid transportation systems, especially those adapted for high pressures and for temporary installations. The method comprises assembling a plurality of subassemblies of the flow line at an assembly site remote from a site where the system will be installed. The subassemblies are supported on a plurality of skids which support the subassemblies for movement along a vertical axis and two intersecting horizontal axes. The subassemblies then are transported to an installation site on the skids. The skids are deployed such that the subassemblies are disposed in first positions. The first positions approximate respective second positions in which the subassemblies may be connected to each other and to the system. The subassemblies then are adjusted on the skids from the first positions to the second positions, after which they are connected to each other and to the system to complete the flow line. Preferably, the method employs the novel skids.

In other of its various aspects and embodiments, the subject invention relates generally to methods of inspecting flow lines and flow line components on site and without substantially disassembling the flow line. Such embodiments include a method of inspecting a flow line in a fluid transportation system for injecting fluid under high pressure into a well. The system incorporates a single flow line running from the discharges from a plurality of pumps to a well head. The method comprising running an in-line inspection tool through the single flow line. The in-line inspection tool is selected from the group consisting of cameras, magnetic-flux leakage units, magnetic particle detection units, electromagnetic acoustic transducers, pit gauges, calipers, and 3-D laser units.

Finally, still other aspect and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

Figure 1:
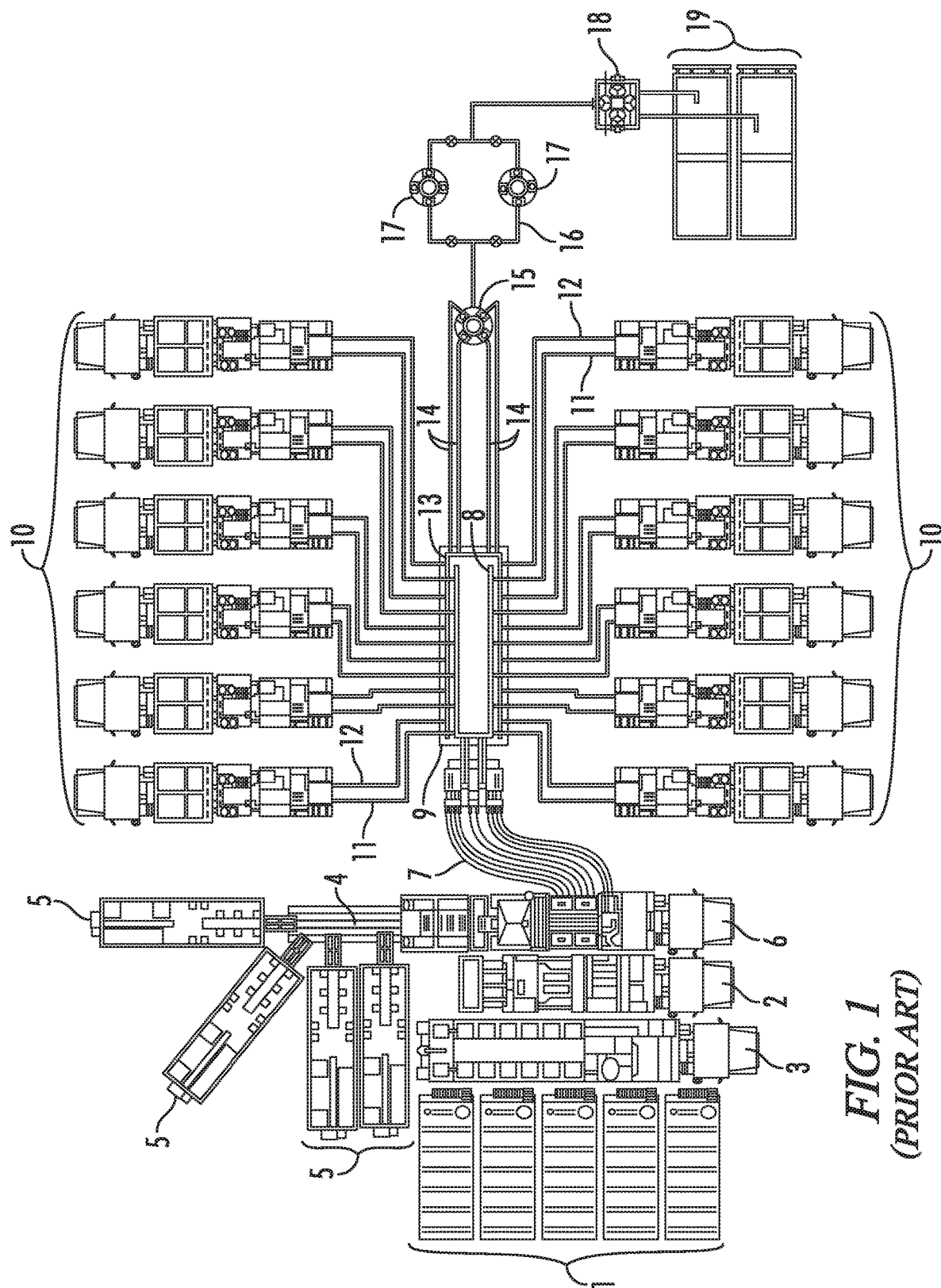
FIG. 1 (prior art) is a schematic view of a system for fracturing a well and receiving flow back from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluid transportation systems and flow lines used in those systems, and especially to flow lines and flowline components that are used to convey abrasive, corrosive fluids under high pressure. Various specific embodiments will be described below. For the sake of conciseness, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The novel flowlines and flowline components typically will be used to connect process or flow units for temporary fluid transportation systems. They are particularly useful for temporary installations that must be assembled and disassembled on site. Such systems are common in chemical and other industrial plants, on marine dredging vessels, strip mines, and especially in the oil and gas industry. Frac systems, such as those shown in FIG. 1, are a very common application where temporary high-pressure flow lines are routinely used to provide fluid conduits between process or flow units.

Figure 2:
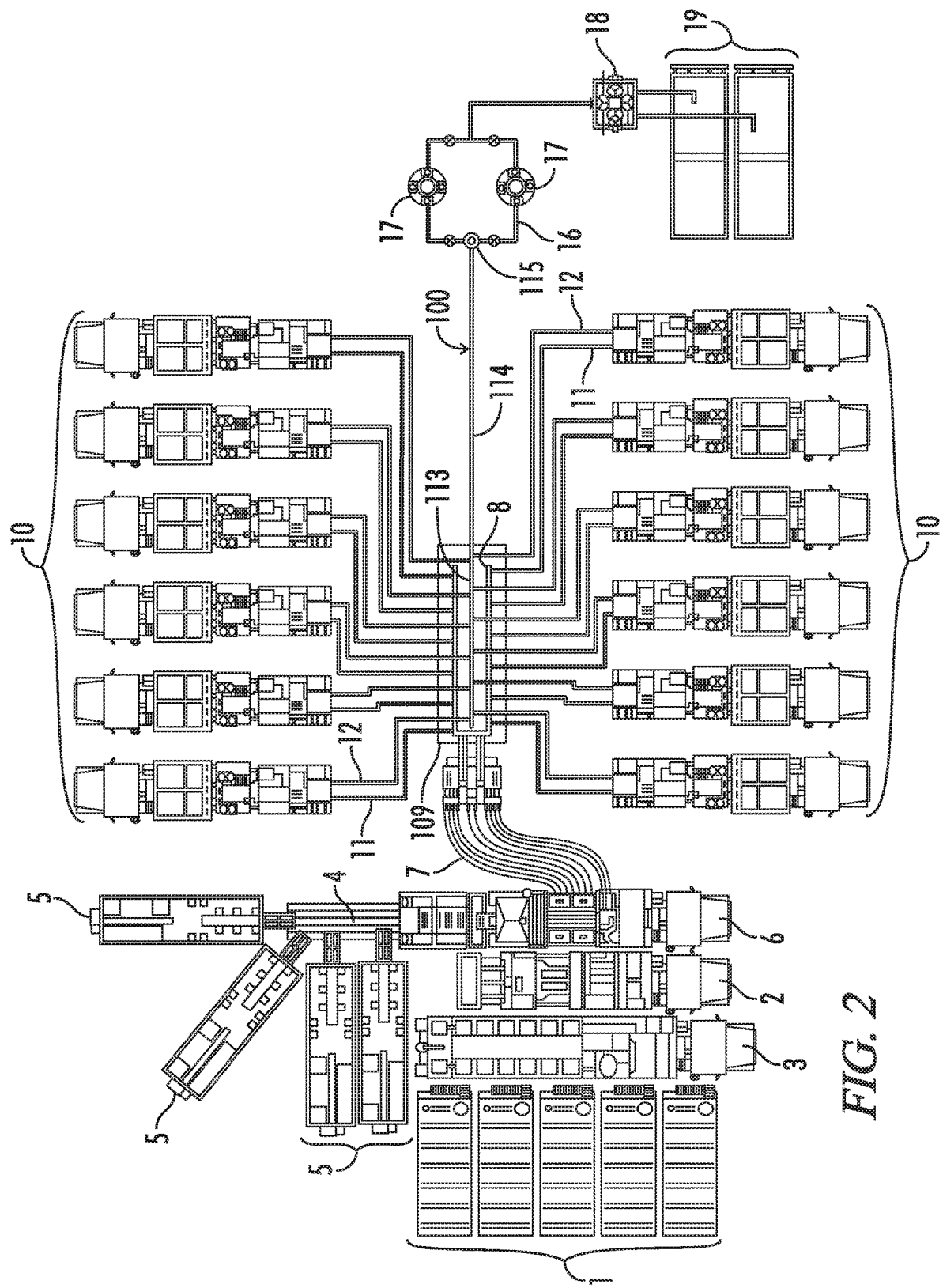
FIG. 2 is a schematic view of a frac system incorporating a first preferred embodiment 100 of the flow lines of the subject invention, which flow line 100 provides a single high-pressure conduit between pumps 10 and zipper manifold 16.

The novel flow lines and flowline components are particularly suited for use in frac systems such as the system shown in FIG. 1. For example, a first preferred embodiment 100 of the flow lines of the subject invention is shown schematically in FIG. 2. In many respects the novel frac system shown in FIG. 2 is identical to the frac system of FIG. 1. It will be noted, however, that the frac system of FIG. 1 incorporates a pair of relatively small diameter missiles 13 in frac manifold 9. Missiles 13 receive the discharge from pumps 10. That system also has four relatively small diameter high-pressure flow lines 14 which feed into goat head 15. In contrast, the novel system shown in FIG. 2 incorporates a novel frac manifold 109 which is part of a single flow line 100. Flow line 100 carries the entire discharge from pumps 10 and runs from discharge lines 12 of pumps 10 to a junction head 115 of zipper manifold 16.

Figure 3:
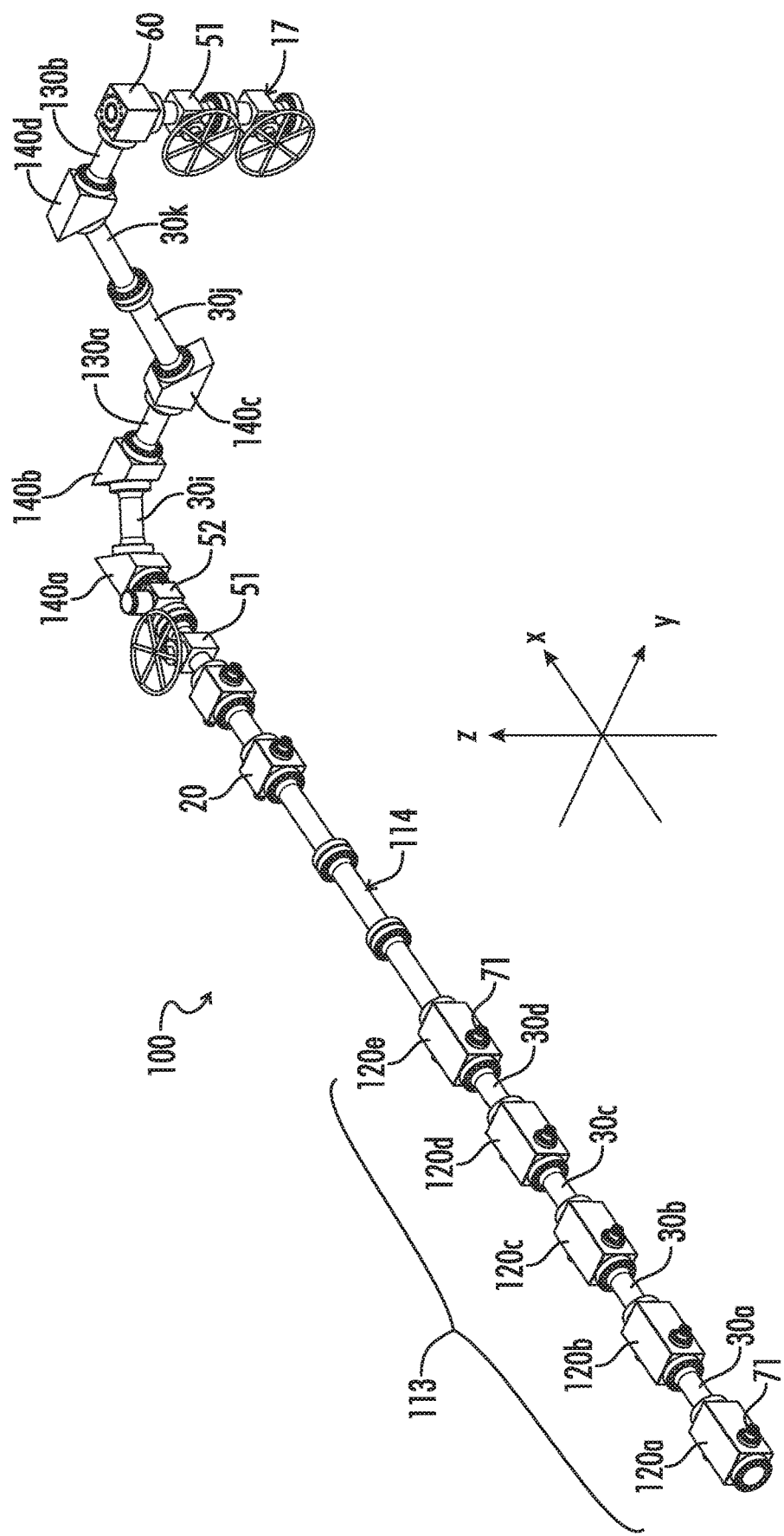
FIG. 3 is an isometric view of novel flow line 100.
Figure 4:
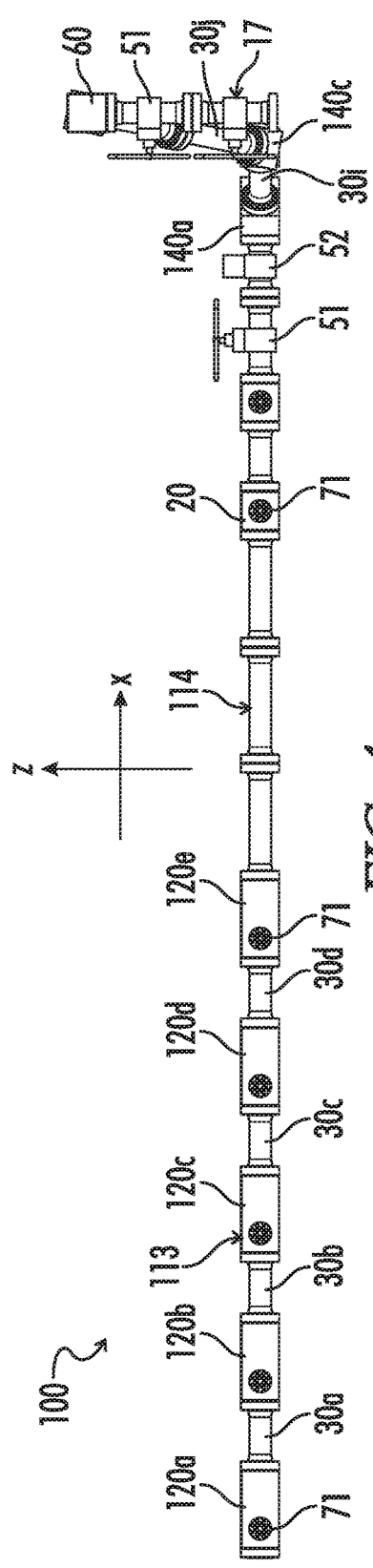
FIG. 4 is an elevational view of flow line 100 shown in FIG. 3.
Figure 5:
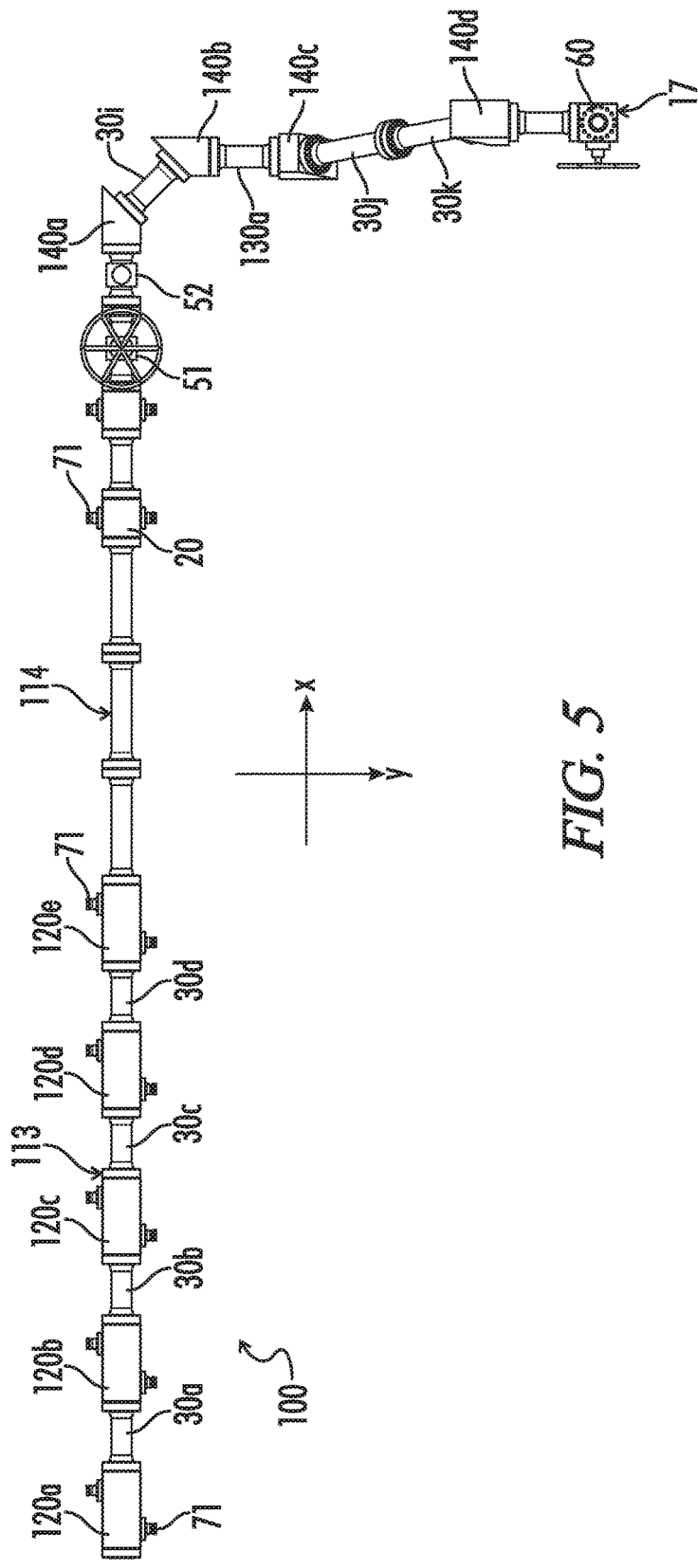
FIG. 5 is a top plan view of flow line 100 shown in FIGS. 3-4.

Flow line 100 is shown in greater detail in FIGS. 3-5. As seen therein, flow line 100 generally comprises block offset cross junctions 120, spools 30, block cross junctions 20, valves 51 and 52, angled shims 140, and offset spools 130. It will be noted that for the sake of simplification, FIGS. 3-5 shows connections for 10 pumps 10 instead of 12 pumps 10 as shown in FIG. 2. Flow line 100 also is connected to a single well head 17 whereas in FIG. 2 flowline is illustrated as feeding into junction head 15 of zipper manifold 16.

Well head 17 comprises a block tee connector 60 and a pair of manual gate valves 51. In accordance with common industry practice, many other components may be assembled into well head 17. Such components also are not illustrated for the sake of simplicity. It also will be appreciated that in the context of novel flow lines which are adapted to deliver fluid from a plurality of pump discharges to a well head, the well head not only will be considered to include such conventional well head assemblies, but also zipper manifolds and the like which may selectively divert flow into a plurality of individual well heads.

Offset cross junctions 120a-120e are connected to an array of pumps 10 (not shown in FIGS. 3-5). More specifically, each offset cross junction 120a-120e is connected to two pumps 10 positioned on opposite sides of flow line 100, and are interconnected by spools 30a-30d. Offset cross junctions 120 are shown in greater detail in FIGS. 6-7. As seen therein, offset cross junctions 120 have a somewhat elongated solid rectangular body 121 having a main bore 122. Bore 122 provides the primary conduit through which slurry passes as it is conveyed towards well head 17. Bore 122 extends between opposing flat surfaces or union faces 123 on body 121. The center of bore 122 may be viewed as defining the central axis of offset cross junction 120.

Figure 6:
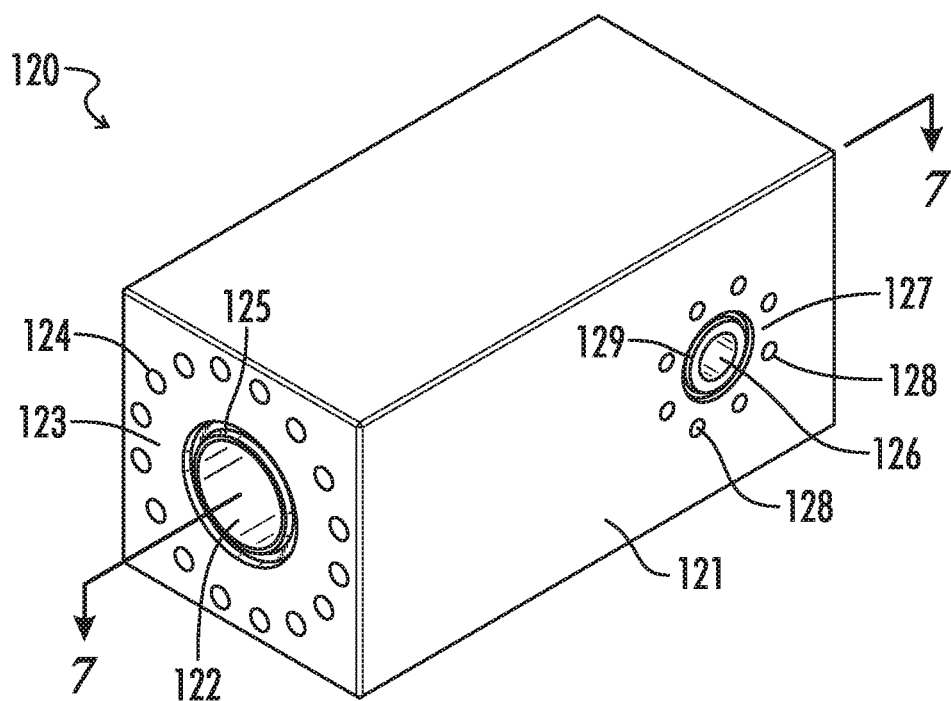
FIG. 6 is an isometric view of a first preferred embodiment 120 of a block junction which may be used, for example, in flow line 100, which junction 120 provides an offset cross junction in flow line 100.

As appreciated from in FIG. 6, union faces 123 are provided with, for example, 16 bottomed holes 124. Holes 124 typically are threaded to accept standing bolts or other threaded connectors (not shown). Alternately, holes 124 may be adapted to receive threaded studs (not shown). Holes 124 are arranged angularly about conduit 122. When provided with studs or other threaded connectors, holes 124 allow mating components, such as spools 30 to be joined to offset cross junctions 120 by a flange-type union. More or fewer holes 124 and connectors may be provided depending upon the size of the union between the components and the pressures for which the union will be rated. Typically, union faces 123 will be provided with a metal seal (not shown) which is disposed in a groove, such as annular groove 125 extending around conduit 122. A seal is generally required to avoid leakage at union faces 123.

Offset cross junctions 120 also are provided with a pair of bores 126 which provide conduits for feeding discharge from an individual pump 10 into primary bore 122. Bores 126 extend perpendicularly from opposing flat union faces 127 on body 121 and lead into and intersect with main bore 122. It will be noted that bores 126 intersect with main bore 122 at right angles as may be seen in FIG. 7. Bores 126, however, intersect with main bore 122 at axially offset junctions. As discussed further below, offsetting the junctions between feed bores 126 and primary bore 122 will help to minimize areas of concentrated erosion in cross junctions 120.

Like primary union faces 123, feed union faces 127 comprise a plurality of holes is 128, in this case 8. Holes 128 allow mating components, such as pump discharge lines 12 to be joined to offset cross junctions 120 by threaded studs or other threaded connectors. Feed union faces 127 also will have a metal seal (not shown) disposed in an annular recess 129. Like union faces 123, feed union faces 127 may be varied in accordance with common practice in the art.

Offset cross junctions 120a-120e are joined by spools 30a-30d. Spools 30 are conventional spools. As such they comprise a pipe which provides a conduit for conveying fluid between fittings in flow line 100, such as between cross junctions 120 and between angled shims 140a and 140b. A pair of flanges are provided at each end of the pipe. The outer flat surfaces of the flanges provide union faces. Each of the flanges is provided with, for example, 16 bolt holes extending through the flanges. The holes are adapted to accommodate the passage of threaded connectors, such as threaded studs or bolts. The holes allow spools 30 to be joined, for example, to cross junctions 120 in flow line 100. The flanges also are provided with a metal seal. The union faces on spools 30, however, may be varied as desired in accordance with common practice in the art.

Offset cross junctions 120a-120e and spools 30a-30d may be viewed as a subassembly 113 of flow line 100. Though not shown in FIGS. 3-5 for the sake of simplification, it will be appreciated that flowline segment 113 typically will be mounted on a skid or trailer as part of frac manifold 109. Frac manifold 109 also may include at least one low-pressure line 8, to which will be connected low-pressure suction hoses 11 for feeding slurry to pumps 10.

Discharge lines 12 of pumps 10 feed into flowline segment 113 of frac manifold 109. They may be connected to offset cross junctions 120 by various conventional unions. Discharge lines 12 may terminate in a flanged sub allowing them to be connected directly to cross junctions 120 at feed union faces 127. Alternately, a flanged, female sub 71 of a hammer union may be connected to feed union faces 127 as shown in FIGS. 3-5. Discharge lines 12 of pumps 10 then may be connected to cross junctions 120 by hammer unions.

Thus, in contrast to conventional frac manifold 9, which has two relatively small manifolding missiles 13 which themselves are manifolded, novel frac manifold 109 comprises a single, larger, straight segment 113 of flowline 100 which receives the discharge from all pumps 10. That is, in conventional frac systems, such as those shown in FIG. 1, pumps 10 will be lined up on both sides of frac manifold 9. Pumps 10 on one side of frac manifold 9, as represented schematically in FIG. 1, typically will feed into the missile 13 running along that side of frac manifold 9. Pumps 10 which are lined up on the other side will feed into the missile 13 running on the other side of frac manifold 9. Missiles 13 are manifolded by a section of pipe which connects their downstream ends at right angles. The combined discharge from missiles 13 then is distributed into four high-pressure flow lines 14 which run to goat head 15.

As shown schematically in FIG. 2, pumps 10 from both sides of frac manifold 109 all feed into flowline segment 113. Offset cross junctions 120 allow two pumps 10 to feed into flow line 100 from opposite sides of flowline 100. Frac manifold 109, therefore, will have a simpler, less cluttered design. It may be assembled more easily, and when in service, will allow greater access to manifold components for hook up and service. More importantly, however, novel frac manifolds incorporating a single, larger flow line section, such as segment 113, should provide better wear resistance and a longer service life than conventional frac manifolds incorporating multiple missiles.

That is, the slurry flowing through flow lines is highly abrasive and corrosive, moves at relatively high velocities under high pressure, and is quite turbulent in many areas. Consequently, flowline components tend to suffer material loss which can weaken the part and shorten its service life. The material loss results from a number of different dynamics, including ductile erosion and brittle erosion, both of which are exacerbated by corrosion.

Ductile erosion results from entrained sand and other particles dragging along the inner walls and cutting or ploughing into the walls. The angle of impingement typically is small, less than 30°. Ductile erosion is the primary dynamic in relatively straight sections of flow lines. Brittle erosion results from entrained sand impinging on the walls at near normal to the surface, the impact causing tiny radial cracks in the wall. Brittle erosion is the primary dynamic in turbulent areas of the flow line or where the flow line changes direction.

It also will be appreciated that corrosion generally tends to weaken material in the part. The part, therefore, is more susceptible to both ductile and brittle erosion. Moreover, since flowline components typically are fabricated from relatively hard steels, brittle erosion from near normal impacts caused by more turbulent flow typically plays a larger role than ductile erosion resulting from more laminar flow.

For example, turbulence and brittle erosion is the primary dynamic in the area where pump discharge lines 12 feed into missiles 13 of conventional frac manifold 9. Fluid from discharge lines 12 immediately hits the other side of missile 13, which is only a few inches away. More specifically, the inner diameter of high-pressure missiles in conventional frac manifolds typically will be sized such that they cumulatively provide the required flow rates (up to 100 bbl/minute) without excessively high fluid velocity through the missiles. The upper limit, often referred to as the erosional fluid velocity, generally is about 40 ft/sec. Thus, missiles in conventional frac manifolds typically will be made up from 3" or 4" components having, respectively, inner diameters of 2.75" and 3.5".

In contrast, novel flow lines having comparable flow rates and velocities will incorporate 5⅛" or 7 1/16" components having, respectively, inner diameters of 5.13" and 7.06". Thus, for example in novel flowline segment 113, it will be appreciated that fluid entering primary bore 122 of offset cross junctions 120 from feed bores 126 will have more room to spread. The quantity and velocity of particles impinging on the other side of primary bore 122 at near normal angles will be less than experienced by smaller diameter pipes, such as missiles 13 in conventional frac manifold 9.

Figure 7:
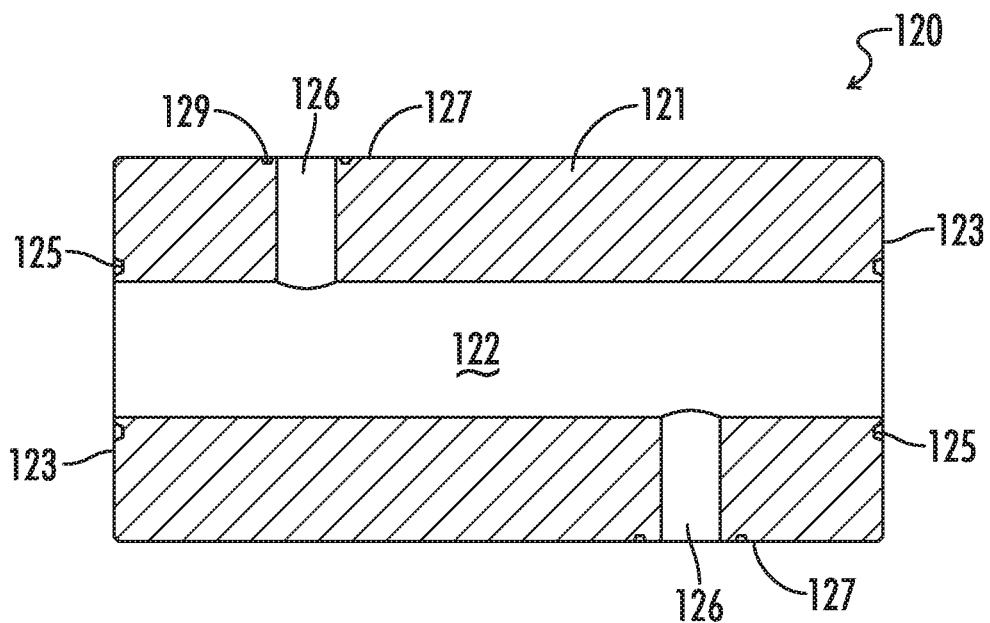
FIG. 7 is a cross-sectional view of offset cross junction 120 shown in FIG. 6.

Moreover, offsetting the junctions between feed bores 126 and primary bore 122 will help to minimize areas of concentrated turbulence and erosion in cross junctions 120. Turbulence created by fluid entering primary bore 122 from an upstream feed bore 126 will tend to diminish, and the flow will become more laminar as fluid travels down primary bore 122. Feed bores 126, therefore, preferably are spaced at sufficient distances to allow turbulence to substantially subside. For example, feed bores 126 may be offset a distance at least approximately equal to the diameter of feed bores 126, and more preferably, at a multiple thereof. Feed bores 126 as illustrated in FIGS. 6-7, for example, are offset by a factor of approximately 7 relative to their diameters.

Moreover, the novel flow lines preferably, as does flow line 100, incorporate block cross junctions and other block fittings, that is, junction and directional fittings having prismatic or solid rectangular bodies. As compared to the tubular fittings from which missiles in conventional frac manifolds traditionally are assembled, block fittings, such as offset cross junction 120, provide additional thickness in conduit walls. Block fittings can tolerate more erosion before reaching a point where the integrity of the fitting is compromised.

Figure 8:
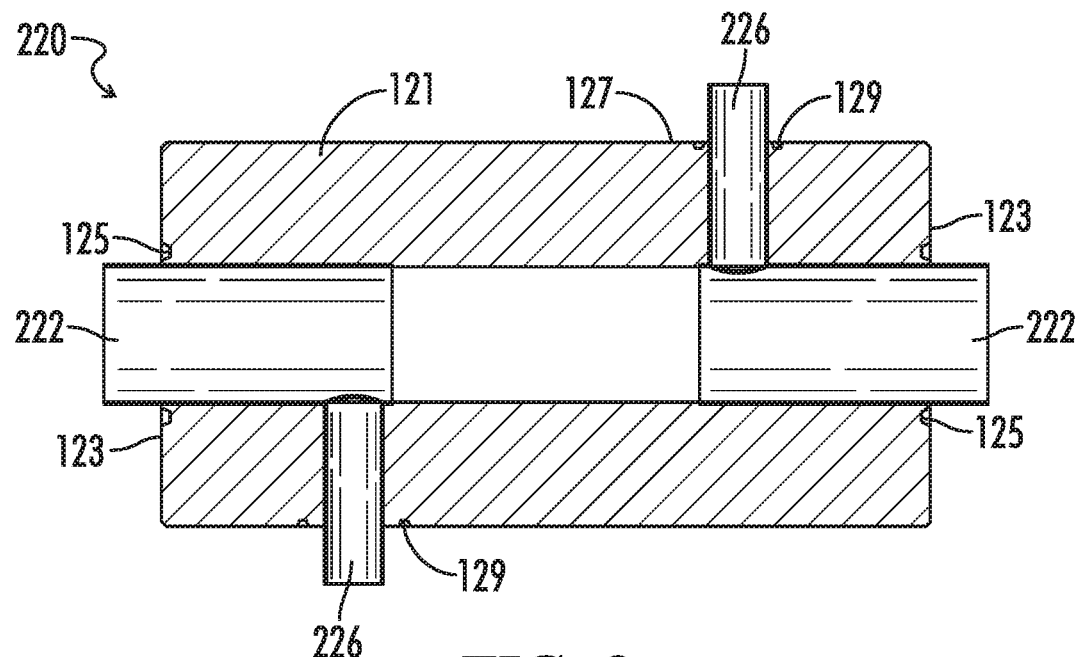
FIG. 8 is a cross-sectional view of a second preferred embodiment 220 of a block junction which may be used, for example, in flow line 100. Junction 220 is substantially identical to offset cross junction 120 shown in FIGS. 6-7 except that it incorporates wear sleeves 222 and 226.
Figure 9:
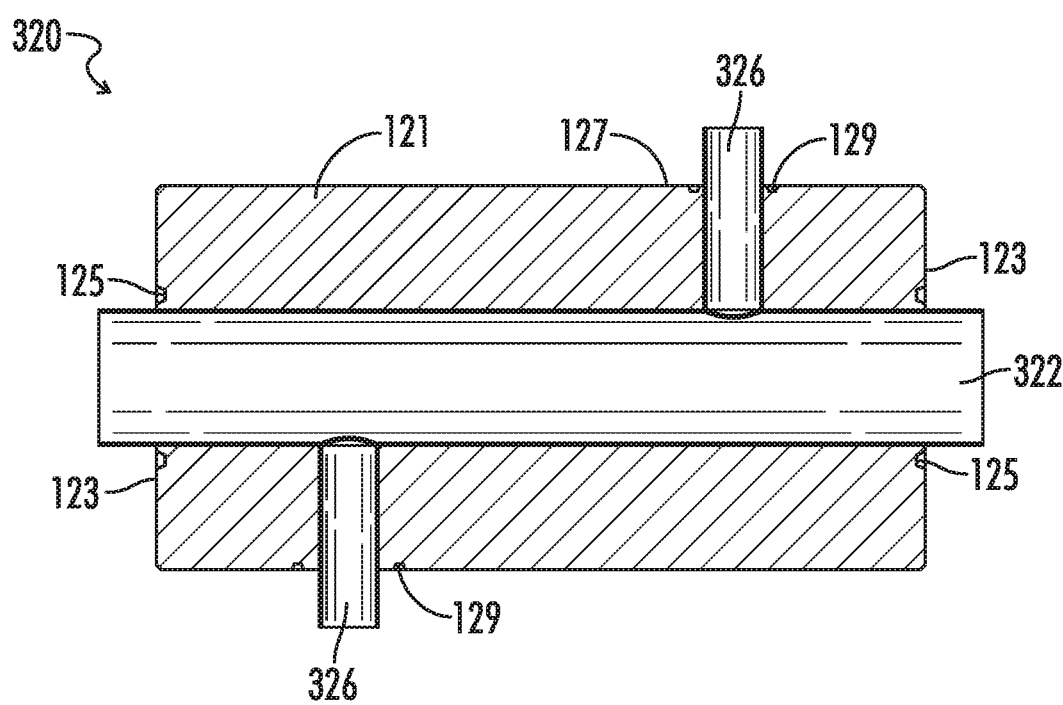
FIG. 9 is a cross-sectional view of a third preferred embodiment 320 of a block junction which may be used, for example, in flow line 100. Junction 320 is substantially identical to offset cross junction 120 shown in FIGS. 6-7 except that it incorporates wear sleeves 322 and 326.

Block junctions also may easily incorporate wear sleeves. For example, offset cross junctions 220 shown in FIG. 8 is substantially identical to offset cross junction 120 except that has wear sleeves 222 and 226. Likewise, offset cross junction 320 shown in FIG. 9 is substantially identical to offset cross junction 120 except that it has wear sleeves 322 and 326. As discussed further below, such wear sleeves can provide additional resistance to erosion and wear, especially when provided in areas subject to turbulent flow. Wear sleeves also may be replaced after a period of service, thus avoiding the need to scrap an entire part.

Finally, frac manifolds usually are mounted on a skid or trailer so that they may be transported easily to and from a well site. That is a significant advantage. The need to transport the manifold over roads and highways without special permits, however, limits the size of the skid or trailer platform and can create significant spatial constraints in the design and layout of the manifold. Frac manifolds having two or more missiles, such as frac manifold 9, require very sharp turns in the flow line and often more junctions. For example, each missile typically will make a right turn, or it will tee into a manifolding pipe. Such turns and junctions are particularly susceptible to erosion. They are eliminated in the novel flow lines, such as flowline segment 113, which provide a single straight flow line accepting discharge from both sides of the segment.

Figure 10:
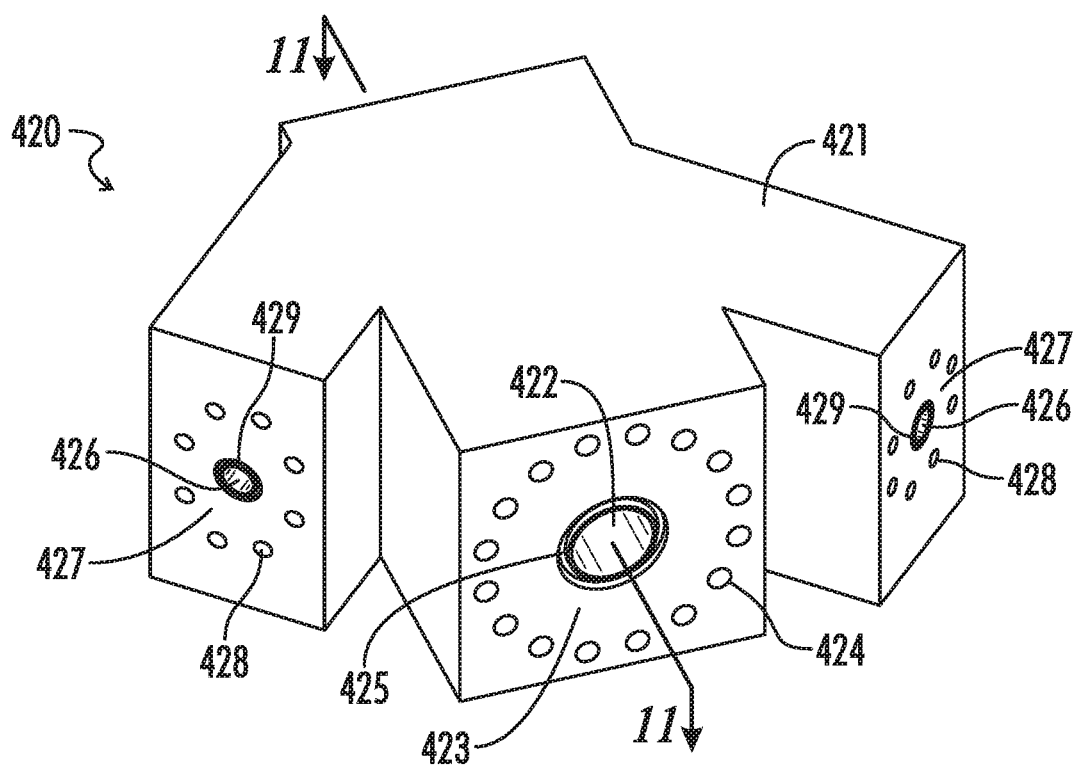
FIG. 10 is an isometric view of a second preferred embodiment 420 of a block junction which may be used, for example, in flow line 100, which junction 420 provides an offset lateral cross junction in flow line 100.

While offset cross junctions 120 of flowline segment 113 provide many advantages, it will be appreciated that other junctions accepting feed from two or more pumps may be incorporated into the novel flow lines. For example, offset lateral cross junction 420 shown in FIGS. 10-11 may be connected to two pumps 10. Offset lateral cross junction 420 has a body 321. The main portion of body 421 has a generally cuboid shape with trapezoidal prism shaped arms extending from opposite faces. Body 421 has a main bore 422. Bore 422 provides the primary conduit through which slurry passes as it is conveyed towards well head 17. Bore 422 extends between opposing flat surfaces or union faces 423 on body 421.

Offset lateral cross junctions 420 also are provided with a pair of bores 426 which provide conduits for feeding discharge from an individual pump 10 into primary bore 422. Bores 426 extend perpendicularly from flat union faces 427 on body 421 and lead into main bore 422. Primary union faces 423 and feed union faces 427 are substantially identical to union faces 123 and 127 in offset cross junction 120.

Figure 11:
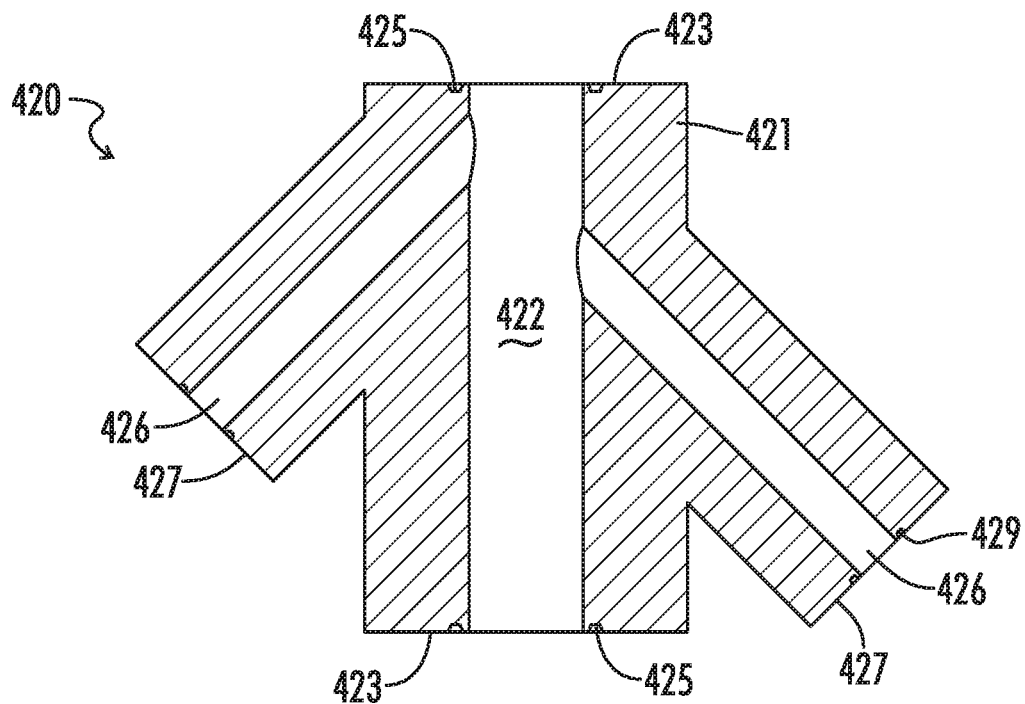
FIG. 11 is a cross-sectional view of offset lateral cross junction 420 shown in FIG. 10.
Figure 12:
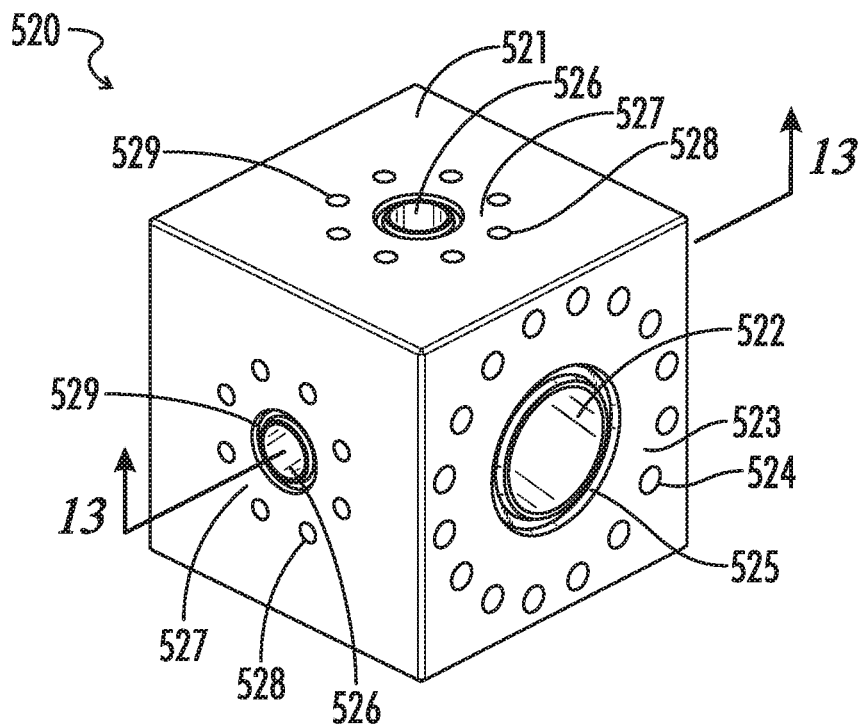
FIG. 12 is an isometric view of a third preferred embodiment of a block junction 520 which may be used, for example, in flow line 100, which junction 520 provides a right-angle cross junction in flow line 100.
Figure 13:
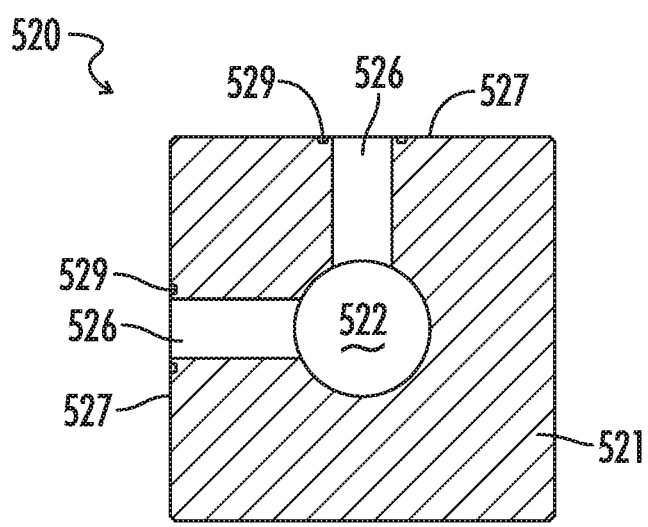
FIG. 13 is a cross-sectional view of right-angle cross junction 520 shown in FIG. 12.

It will be noted that bores 426 of offset lateral cross junction 420 intersect with main bore 422 at an interior angle, for example, 45° as shown in FIG. 11. Bores 426 also intersect with main bore 422 at axially offset junctions. Thus, it is expected that lateral cross junction 420 will provide further improvements in wear resistance and service life. Fluid entering primary bore 422 of lateral cross junctions 420 from feed bores 426 will not only have more room to spread, but will enter primary bore 422 at an angle. Particles impinging on the other side of primary bore 422 on average will impact at much shallower angles, further reducing the effects of brittle erosion.

Consistent therewith, the intersection angle between feed bores 426 and primary bore 422 may be varied. Preferably, it will be less than 90°. Little benefit will realized at angles near 90°. More preferably, the intersection angle will be from about 30° to about 60°. It also will be appreciated, as compared to the offset between feed bores 126 in offset cross junction 120, feed bores 426 in lateral cross junction 420 may be offset to a lesser degree. Since fluid is entering primary bore 422 at a shallower angle, turbulence in primary bore 422 will diminish more rapidly, and assume a more laminar flow than in primary bore 122 of offset cross junction 120.

Right-angle cross junction 520, which is shown in FIGS. 12-43, also may be incorporated into flow line 100 and connected to two pumps 10. Right-angle cross junction 520 has a generally cubic body 521 having a main bore 522. Bore 522 provides the primary conduit through which slurry passes as it is conveyed towards well head 17. Bore 522 extends between opposing flat surfaces or union faces 523 on body 521.

Right-angle cross junctions 520 also are provided with a pair of bores 526 which provide conduits for feeding discharge from an individual pump 10 into primary bore 522. Bores 526 extend perpendicularly from adjacent flat union faces 527 on body 521 and lead into main bore 522. Primary union faces 523 and feed union faces 527 are substantially identical to union faces 123 and 127 in offset cross junction 120.

It will be noted that bores 526 in right-angle cross junctions 520 are perpendicular to each other and intersect with main bore 522 and each other at right angles. Right-angle cross junctions 520, therefore, may make it easier to assemble pump discharge lines 12 from pumps 10 on either side of cross junction 520. Consistent therewith, it will be appreciated that the angle between bores 526 may be varied. The angle may be somewhat greater or lesser than 90° and still facilitate connection of pump discharge lines 12 from pumps staged on opposite sides of cross junction 520. Bores 526 also may be offset along main bore 522, similar to offset cross junction 120, may intersect with main bore 522 at an angle, similar to offset lateral cross junction 420, or may incorporate both such features.

The portion of flow line 100 extending from offset cross junction 120e to well head 17 may be viewed as a subassembly 114. Flowline segment 114, as illustrated, may incorporate additional or fewer spools 30 of varying lengths running from flowline segment 113 to make up the distance between frac manifold 109 and junction 115 of zipper manifold 16. The novel flow lines also may incorporate other conventional flow line components, units, and subassemblies. For example, flowline segment 114 incorporates cross junctions 20. Cross junctions 20 may be used to allow additional flowline components or segments to be added, such as pressure relief valves or bleed-off lines. The novel flow lines also may incorporate, for example, gauges and other monitoring equipment, as well as control devices such as shut off, plug, check, throttle, pressure release, butterfly, and choke valves. For example, flow line 100 is provided with valves 50 and 51. Valve 50 is a conventional manual gate valve. Valve 51 is a conventional hydraulic valve which may be controlled remotely.

Figure 14:
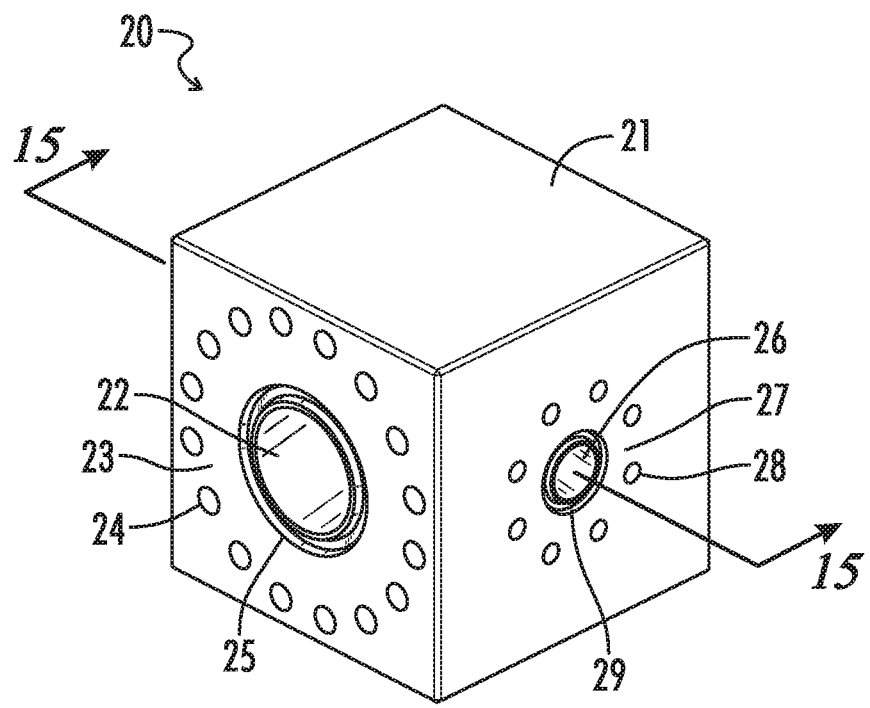
FIG. 14 is an isometric view of a block cross junction 20 used in flow line 100.
Figure 15:
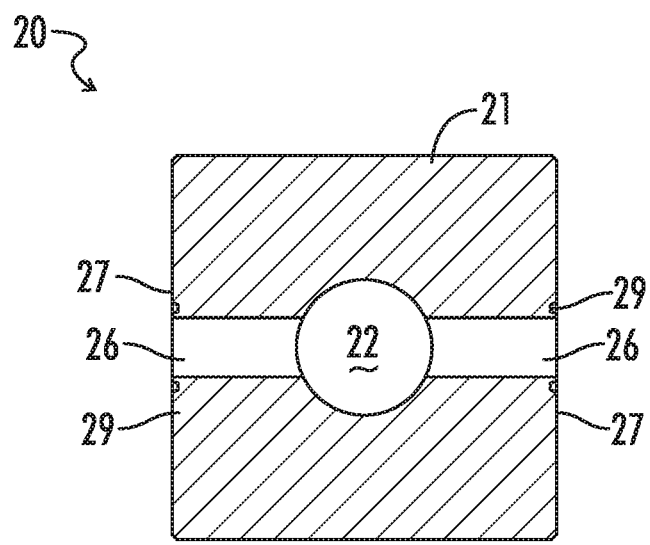
FIG. 15 is a cross-sectional view of cross junction 20 shown in FIG. 14.

Cross junctions 20 are shown in greater detail in FIGS. 14-15. As seen therein, cross junction 20 has a generally cubic body 21 having a main bore 22. Bore 22 provides the primary conduit through which slurry passes as it is conveyed towards well head 17. Bore 22 extends between opposing flat surfaces or union faces 23 on body 21. Cross junctions 20 also are provided with a pair of bores 26 which provide conduits for feeding discharge from an individual pump 10 into primary bore 22. Bores 26 extend from opposing flat union faces 27 on body 21 and lead into and intersect with main bore 22. Primary union faces 23 and feed union faces 27 are substantially identical to union faces 123 and 127 in offset cross junction 120.

It will be noted that bores 26 are aligned along their central axes and intersect with main bore 22 at right angles. Thus, it will be appreciated that cross junctions 20 may be more suitable for diverting flow from a main flow line, such as flow line 100. They may be used to connect pumps 10, but opposing high-pressure, high-velocity flows, such as the discharge from pumps 10, may create undesirable harmonics in the system and lead to excessive vibration.

Flow lines necessarily must change course as flow is split or combined. Ideally, however, those portions of a flow line extending between junction fittings, would extend in a straight line. Unfortunately, that rarely, if ever, is possible. For example, as best appreciated from FIGS. 3-5, in flowline 100 junctions 120 are all aligned and extend in a straight line. Junctions 120, however, are not aligned with well head tee connector 60, nor is it necessarily practical to position pumping units 10, frac manifold 113, and other frac equipment such that they are aligned. There is a large amount of equipment at a well site, especially during fracturing operations. The flow line must be able to accommodate whatever spatial constraints are present at a site.

Thus, as discussed further below, the novel flow lines may incorporate various combinations of angled shims, standard spools, and offset spools to change the direction or course of the flow line as required for a specific well site. For example, as shown in FIGS. 3-5, flow line 100 runs straight along the x-axis between offset cross junction 120a and angled shim 140a. The heading of flow line 100 may be changed by incorporating various combinations of angled shims 140, standard spools 30, and offset spools 130. Specifically, angled shims 140a-140b and offset spools 130a and 130b have been used to provide changes in the heading of flow line 100 along all three axes x, y, and z to accommodate the position of frac manifold 109 relative to well head 17.

Figure 16:
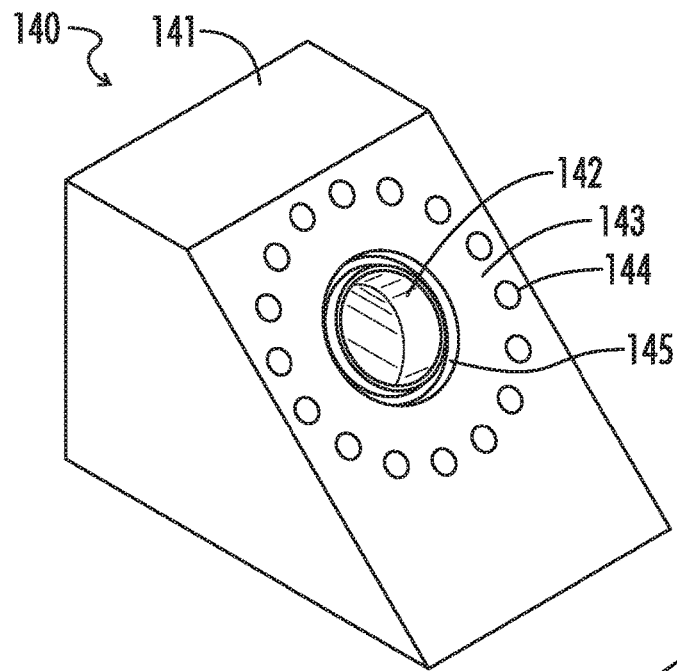
FIGS. 16-17 are isometric views of a first preferred embodiment 140 of the angled shims of the subject invention which may be used, for example, in flow line 100.
Figure 17:
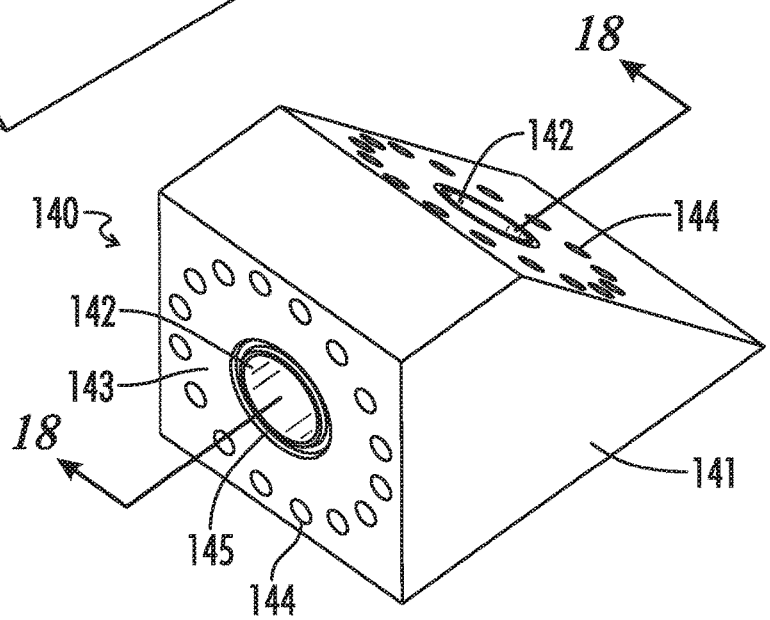
Figure 18:
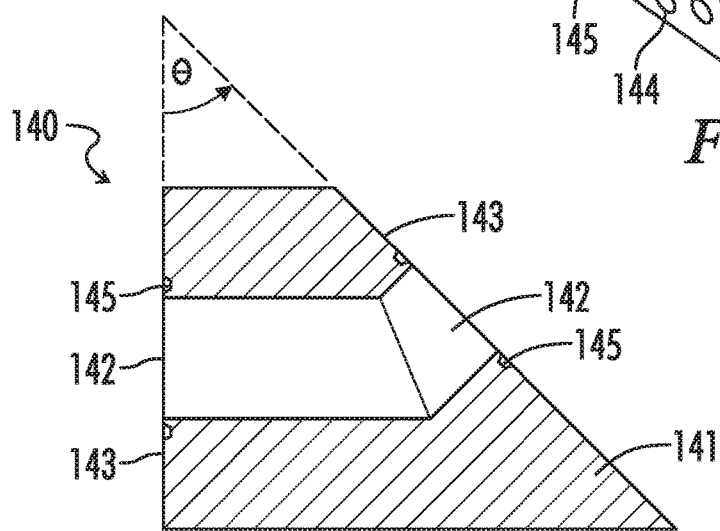
FIG. 18 is a cross-sectional view of novel angled shim 140 shown in FIGS. 16-17.

Angled shims 140 are shown in greater detail in FIGS. 16-18. As seen therein, angled shim 140 has a body 141 shaped generally like a truncated or beveled cuboid or a trapezoidal prism. Body 141 has intersecting bores 142. Bores 142 provide the primary conduit through which slurry passes as it is conveyed towards well head 17. Bores 142 extend perpendicularly inward from flat surfaces or union faces 143 and interest within body 141.

As appreciated from in FIGS. 16-17, union faces 143 are provided with, for example, 16 bottomed holes 144. Holes 144 typically are threaded to accept standing bolts or other threaded connectors (not shown). Alternately, holes 124 may be adapted to receive threaded studs (not shown). Holes 144 are arranged angularly about bores 142. When provided with studs or other threaded connectors, holes 144 allow mating components, such as spools 30 to be joined to angled shims 140 by a flange-type union. More or fewer holes 144 and connectors may be provided depending upon the size of the union between the components and the pressures for which the union will be rated. Typically, union faces 143 also will be provided with a metal seal (not shown) which is disposed in a groove, such as an annular groove 145 extending around conduit 142. A seal is generally required to avoid leakage at unions at union faces 143.

Figure 19:
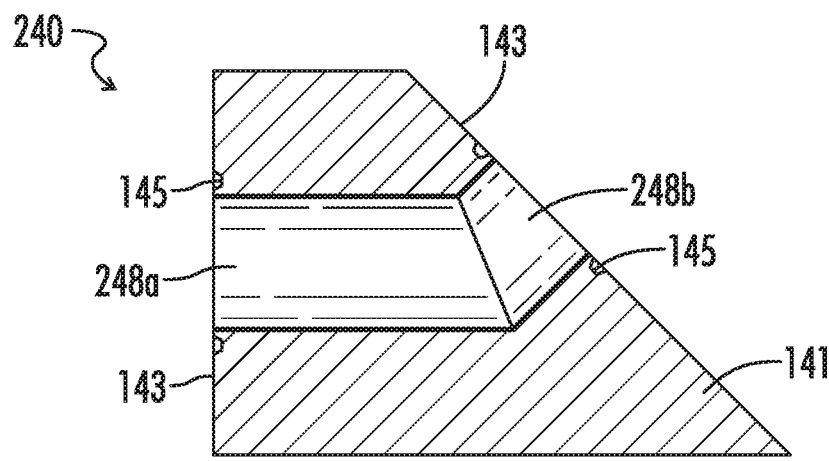
FIG. 19 is a cross-sectional view of a second preferred embodiment 240 of the angled shims of the subject invention which may be used, for example, in flow line 100. Angled shim 240 is substantially identical to angled shim 140 shown in FIGS. 16-18 except that it incorporates wear sleeves 248.

It will be appreciated that, like offset cross junction 120, the novel angled shims also may incorporate wear sleeves. For example, angled shim 240 shown in FIG. 19 is substantially identical to angled shim 140 except that it has wear sleeves 248. Angled shim 340 shown in FIG. 20 also is substantially identical to angled shim 140 except that is has wear sleeves 348. As discussed further below, such wear sleeves can provide resistance to erosion and increase the service life of the components.

The novel angled shims are adapted to provide varying changes in the direction of flow lines by varying the angle θ between union faces. The extended planes of union faces 143 of angled shims 140, for example, intersect at an angle θ where θ is 45° as may be seen in FIG. 18. In other words, union faces are angled 45° relative to each other. Thus, angled shims 140 can provide a 45° turn in flow line 100. For example, as shown in FIGS. 3-5, flow line 100 extends along the x-axis up to angled shim 140a. Angled shims 140a and 140b are coupled by spool 30i and allow flow line 100 to first veer right (45°) and then to veer right again (45°) such that flow line 100 now heads along they-axis. In simple terms, angled shims 140a and 140b have allowed flow line 100 to make a right turn.

The angle θ between the union faces of the novel angled shims may be varied as desired. For example, angle θ may be 30° or 22.5° to provide more gradual changes in direction. Angle θ may be, but typically will not be greater than 45° as such angles produce more severe changes in direction.

It will be appreciated that angled shims 140, as well as block junctions 120, 220, and 520, have been described as having a prismatic shape, or as cuboid, solid-rectangular and the like. Angled shims 140 in fact have a generally prismatic profile, a common geometric definition of the term being a solid geometric figure whose two end faces are similar, equal, and parallel rectilinear figures, and whose sides are parallelograms. Such geometric terms as used herein are intended to describe generally the shape of such block fittings and to distinguish them from fittings which have a pipe-like or generally cylindrical body. The terms are not intended to be limited to the precise geometric definitions. For example, such components would never be fabricated without rounds along the edges, nor is it necessarily essential that opposing faces be exactly parallel or exactly the same. The precise shape may be varied consistent with the purposes described herein.

Figure 21:
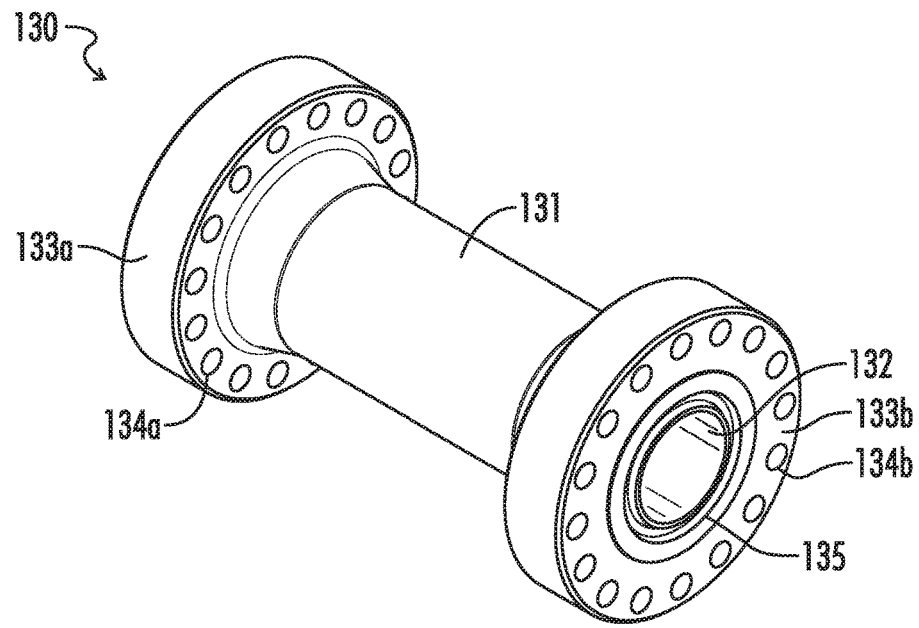
FIG. 21 is an isometric view of a first preferred embodiment 130 of the offset spools of the subject invention which may be used, for example, in flow line 100.
Figure 22:
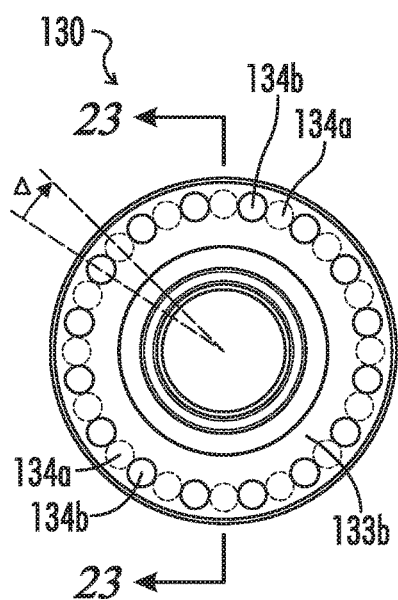
FIG. 22 is an end plan view of the novel offset spool 130 shown in FIG. 21.
Figure 23:
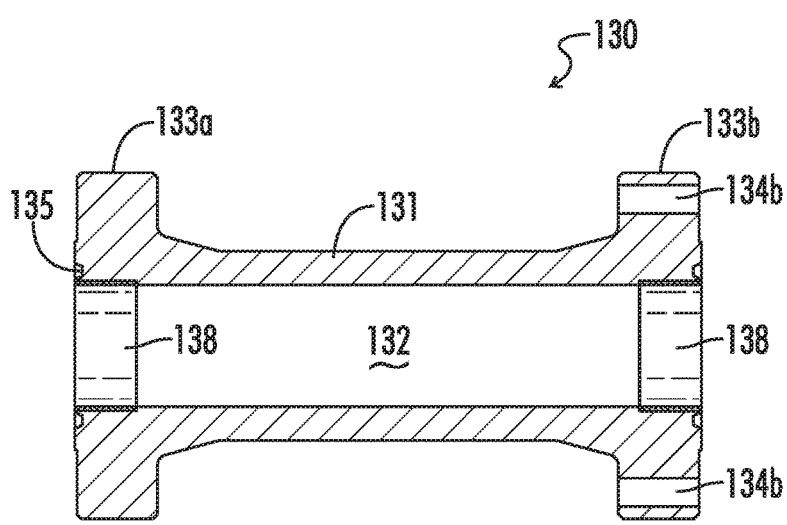
FIG. 23 is a cross-sectional view of offset spool 130 shown in FIGS. 21-22.

Offset spools 130 are shown in greater detail in FIGS. 21-23. As seen therein, offset spools 130 comprise in large part a pipe 131 which provides a conduit 132 for conveying fluid between junction and directional fittings in flow line 100, such as between angled shims 140b and 140c and between angled shim 140d and block tee junction 60 in well head 17. A pair of flanges 133 are provided at each end of pipe 131. The outer flat surfaces of flanges 133 provide union faces. Each flange 133 is provided with, for example, 16 bolt holes 134 extending through flanges 133. Holes 134 are adapted to accommodate the passage of threaded connectors, such as threaded studs or bolts. Holes 134 are arranged angularly on flanges 133 about conduit 132, and thus allow offset spools 130 to be joined to other flowline components, such as shims 140d and block tee junction 60 in flow line 100.

Though described as "flat" herein and appealing to the casual observers as such, typically flanges 133 will have a very shallow annular boss extending around the pipe conduit. Upon careful inspection, the annular boss may be seen in FIG. 23. A metal seal (not shown) is disposed in an annular groove 135 extending around conduit 132 on the shallow, annular boss. Annular boss will help ensure that the abutment between mating union faces is properly loaded when the union is made up. The designs and features of union faces in particular and flange unions in general are well known, however, and the union faces on flanges 133 may be varied in accordance with common practice in the art.

In such respects, offset spools 130 are identical to conventional spools 30. Unlike conventional spools, however, bolt holes 134 on each flange 133 are offset from each other. That is, in conventional spools the bolt holes on one flange are aligned angularly with the bolt holes on the other flange. In other words, if there are 16 bolt holes, the bolt holes on each flange will be spaced radially at 22.5° increments starting at 0°.

Bolt holes 134 on flanges 133 of offset spools 130 also are spaced angularly at 2.5°. As best appreciated from FIG. 22, however, the array of bolt holes 134a (shown in phantom) on flange 133a and the array of bolt holes 134b on flange 133b are offset relative to each other by an angle Δ. In offset spool 130 angle Δ is 11.25°, thus offsetting bolt holes 134a and 134b by 11.25°. Thus, the array of holes 134a on flange 133a will start at 0°, and the array of holes 134b on flange 133b will start at 11.25".

It will be appreciated, therefore, that offset spools 130 also may be used to provide a change of direction in flow line 100. As appreciated best from FIGS. 3 and 5, angled shims 140b and 140c are joined by offset spool 130a. Offset spool 130a allows angled shim 140c to be rotated 11.25" off of the z-axis relative to angled shim 140b. Shim 140c, therefore, will allow flow line 100 not only to veer up (approximately 45°), but to veer left (−11.25°).

Further down flowline segment 114, angled shim 140d is connected to angled shim 140c by conventional spools 30j and 30k. The bolt holes in conventional spools 30j and 30k are not offset. Thus, angled shim 140d also is rotated 11.25" off of the z-axis, and the studs on angled shim 140d will be offset relative to those on tee junction 60. Offset spool 130b will allow angled shim 140d to be connected to tee junction 60, and angled shim 140d will allow flow line to veer down (approximately 45°) and to veer right (11.25°).

Flowline segment 114 thus returns to its prior heading along the y-axis (between angled shims 140b and 140c), but at a higher elevation equal to that of tee junction 60. More simply, angled shims 140c and 140d and offset spools 130a and 130b allow flowline segment 114 to deviate up and to the left and then down and to the right to establish a flow line between angled shim 140b and tee junction 60.

The novel offset spools of the subject invention will allow greater control over the angular alignment of components in a flowline and, therefore, over the direction (or heading) and course (or track) of a flowline. Conventional spools have been used to provide relative rotation of components connected to opposite ends of the spool. Relative rotation can be achieved simply by rotating the array of bolts on the second component relative to its "normal" position. For example, if a component has 16 studs passing through 16 holes on the spool, relative rotation may be achieved in increments of 22.5°.

If used in combination with offset spools, however, relative rotation may be achieved in finer increments. When used in combination with conventional 16-bolt spools, offset spools 130 will allow relative rotation in increments of 11.25°. A component may be rotated a factor of 22.5° or 45°, for example, by using a standard spool. An offset spool 130 may be used to rotate the component by a factor of 22.5° plus or minus 11.25°, for example 11.25°, 33.75°, or 56.25°. Thus, by selectively using either a standard or an offset spool 130, components connected to the ends of the spool may be provided with relative rotation in increments of 11.25°.

It will be appreciated that the novel spools may be offset by varying degrees. For example, and again using a conventional 16-bolt spool as the frame of reference, the offset angle Δ may be 7.5°. By selectively using combinations of standard and offset spools, relative rotation may be provided in increments of 7.5°. A component may be rotated a factor of 22.5° by using a standard spool. An offset spool may be used to rotate the component by a factor of 22.5° plus or minus 7.5°, or two offset spools may be used to rotate the component by a factor of 22.5° plus or minus 15°.

Likewise, offset spools may be provided with different numbers of bolt holes as is common for standard spools, such as 8, 10, or 12 holes. For example, using a 12-bolt spool as the frame of reference where the holes are spaced at 30°, the offset angle Δ may be, for example, 15° or 10°. Using an 8-bolt spool with 45° spacing as the frame of reference, the offset angle Δ may be, for example, 22.5°, 15°, 11.25°, or 7.5°. It also will be appreciated that other flanged components or block fittings having union faces may be offset. For example, bottomed holes 144 on union faces 143 of angled shims 140 may be offset relative to each other. Relative rotation between components connected to angled shims 140, therefore, may be achieved as with offset spools 130. Similarly, cross junction 20 and tee connector 60 may be provided with offset connector holes. For inventory purposes, however, it may be less desirable to "offset" other flow line fittings and components.

It will be appreciated that the novel flowline components have been exemplified largely in the context of assembling flow lines through flange unions. That is, block fittings such as offset cross junction 120 and angled shim 140 have been exemplified as having union faces adapted for connection to another flowline component by a flange union. If desired, however, other types of unions may be used in the novel flow lines. Flanged hammer union or clamp union subs may be joined to a block fitting by a flange union, allowing additional components to be joined by a hammer union or a clamp union. A hammer union sub or a clamp union sub also may be provided integrally on the novel block fittings if desired, although as noted below, various advantages may be gained by assembling the novel flow lines with flange unions.

The flowline components of the subject invention may be fabricated by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, offset cross junctions 120, spools 30, offset spools 130, and angled shims 140, except for their seals, may be fabricated from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part.

As noted above, however, the flow through the high-pressure side of frac systems can be quite turbulent, especially at the unions between flowline components. The flowline components, therefore, may incorporate a wear sleeve. As noted above, offset cross junctions 220 and 230 have, respectively, wear sleeves 222/226 and 322/326. Angled shims 240 and 340 have, respectively, wear sleeves 248 and 348. Lateral cross junctions 420, right-angle cross junctions 520, and cross junctions 20 also may be provided with wear sleeves. Offset spool 130 is provided with wear sleeves 138, as may be standard spools 30.

Offset spool 130 provides a more specific example of how such wear sleeves may be incorporated into the novel components. Wear sleeves 138 of offset spool 130, as their name implies and as may be seen in FIG. 23, have an open cylindrical shape. Wear sleeves 138 are carried in annular recesses in conduit 132 of offset spool 130. They extend axially rearward from the union faces of flanges 133.

Wear sleeves 138 define in part bore 132 extending through offset spool 130, but will be fabricated from more wear resistant materials than those used elsewhere in offset spool 130. For example, wear sleeve 138 may be fabricated from tungsten carbide steel alloys, borided steel, carburized steel, stainless steel, or diamond coated steel.

Wear sleeves 138 may be mounted within offset spool 130 in various ways. For example, they may be relatively loose fitting, and elastomeric O-rings may be provided between wear sleeve 138 and the recess if desired. They may be more closely dimensioned to the recess such that wear sleeves 138 are held securely within offset spool 130 by an interference fit. A tighter interference fit may be provided by shrink fitting sleeves 138 within the recesses. Sleeves 138 also may be welded or brazed into the recesses. Preferably, however, they will be installed in spools 130 such that they may be replaced after a period of service and thereby extend the overall service life of spools 130.

Wear sleeves 138 may extend through the major areas of bore 132 of offset spool 130 where turbulent flow occurs. The precise length of wear sleeves 138 in conduit 132, as well as the length and extent of wear sleeves in other novel components, therefore, may be varied.

For example, angled shim 240 shown in FIG. 19 has a pair of wear sleeves 248. Wear sleeves 248 are similar in many respects to wear sleeves 138 of offset spools 130. They are fabricated from more wear resistant materials and may be mounted therein in similar ways. The inner ends of wear sleeves 248, however, are provided with mating bevels such that wear sleeves 248 extend through the entire course of the bores in angled shim 240. Other flowline components, such as offset cross junctions 120, offset lateral cross junctions 420, tight-angle cross junctions 520, and cross junctions 20, also may be provided with wear sleeves extending the length of their primary bores. Given the typical length of spools, it may not often be the case, but offset spools 130 and standard spools 30 also may be provided with wear sleeves along their entire conduit.

Figure 20:
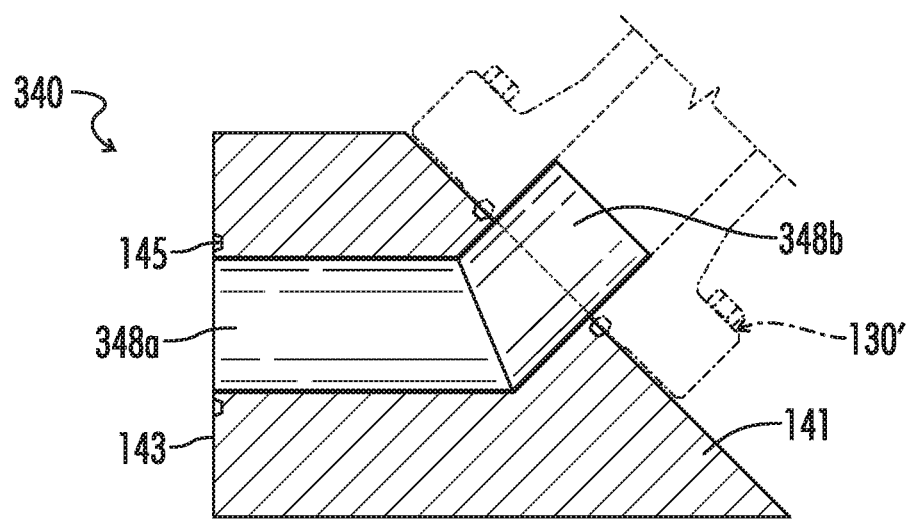
FIG. 20 is a cross-sectional view of a third preferred embodiment 340 of the angled shims of the subject invention which may be used, for example, in flow line 100. Angled shim 340 is substantially identical to angled shim 140 shown in FIGS. 16-18 except that it incorporates wear sleeves 348.

It also will be appreciated that turbulence created in one component may extend into another component to which it is joined. The novel flow line components, therefore, also may be provided with wear sleeves that extend across unions between components. For example, as shown in FIG. 20, angled shim 340 is provided with a pair of wear sleeves 348*a* and 348*b*. Wear sleeves 348 may be fabricated and installed as are wear sleeves 248 in angled shim 240. Like wear sleeve 248*a* in angled shim 240, angled shim 348*a* in angled shim 340 extends along the length of its bore. Wear sleeve 348*b*, however, extends beyond its bore and the corresponding union face 143 in angled shim 340. When angled shim 340 is joined, for example, to an offset spool 130' (shown in phantom), wear sleeve 348*b* will extend into a recess provided in spool 130'. Spool 130', therefore, is provided with protection from turbulence generated within angled shim 340.

Figure 24:
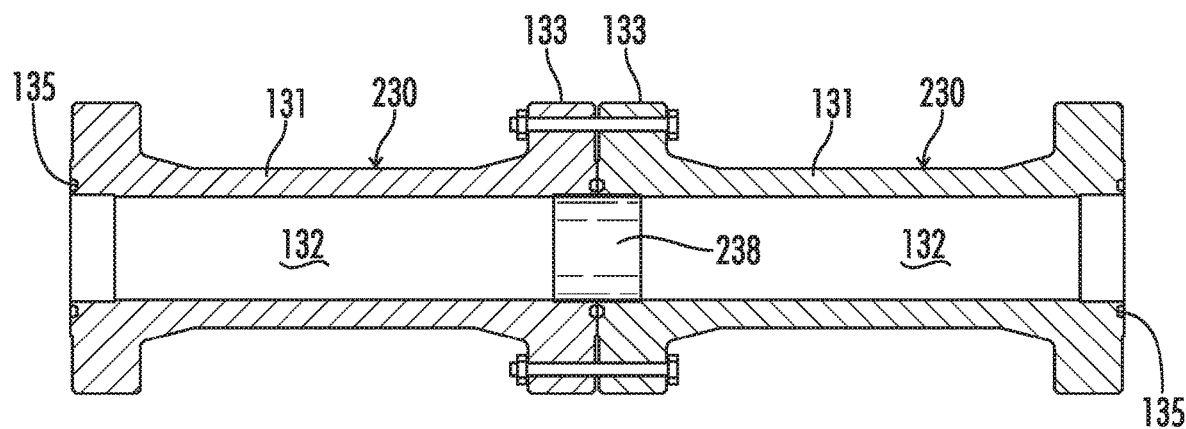
FIG. 24 is a cross-sectional view of a second preferred embodiment 230 of the offset spools of the subject invention which may be used, for example, in flow line 100. Offset spools 230 is substantially identical to offset spool 130 shown in FIGS. 21-23 except that it incorporates wear sleeves 238.

Other flowline components also may be provided with wear sleeves which span the union with other flowline components. For example, offset spools 230 shown in FIG. 24 are provided with a wear sleeve 238 which extends across the union between them. Wear sleeve 238 may be carried in offset spools 230 in the same fashion as in angled shim 240. Offset cross junctions 220 and 320 shown, respectively, in FIGS. 8 and 9 also incorporate, respectively, wear sleeves 222 and 322 which can span the union with other flowline components. Lateral cross junctions 420, right-angel cross junctions 520, cross junctions 20, and spools 30 also may incorporate "spanning" wear sleeves.

Figure 25:
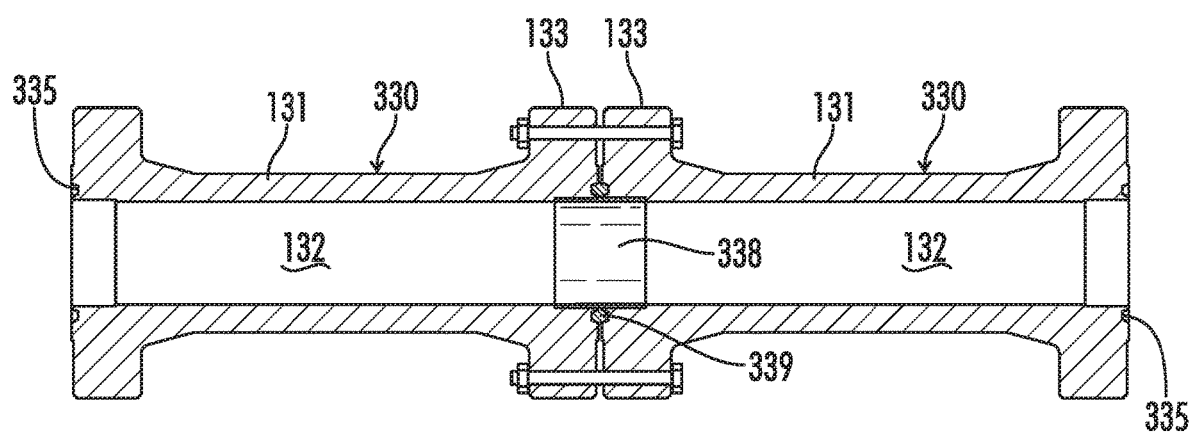
FIG. 25 is a cross-sectional view of a third preferred embodiment 330 of the offset spools of the subject invention which may be used, for example, in flow line 100. Offset spools 330 is substantially identical to offset spool 130 shown in FIGS. 21-23 except that it incorporates wear sleeves 338.

Such "spanning" wear sleeves, however, offer other options for incorporating them into flow line components. For example, offset spools 330 shown in FIG. 25 are provided with a spanning wear sleeve 338. Like wear sleeve 238 in offset spools 230, wear sleeve 338 in offset spools 330 spans the union between them. In contrast, however, wear sleeve 338 has an integral annular metal seal 339 which extends radially from the midsection thereof. Metal seal 339 has a thinned-out portion around which extends the seal portion. Metal seal 339 is sized to fit into mating annular grooves 335 in flanges 133 which extend around conduit 132 on a shallow, annular boss. Metal seal 339, like wear sleeve 338, will be fabricated from harder materials than those used elsewhere in offset spools 330. Thus, s the softer metal from spools 330 will deform and seal against seal 339. Similar wear sleeve designs may be incorporated into other flowline components designed for flange unions.

It also will be appreciated that turbulence is created at unions with feed bores in block junctions. Thus, the feed bores in block junctions such as offset cross junctions 120, lateral cross junctions 420, right-angle cross junctions 520, and cross junctions 20 may be provided with wear sleeves. For example, wear sleeves 226 are provided in feed bores of offset cross junction 220 shown in FIG. 8. Offset cross junction 320 shown in FIG. 9 also has wear sleeves 326 in its feed bores. It will be noted that wear sleeves 226 and 326 in, respectively, offset cross junctions 220 and 320 are designed to span the union with, e.g., the discharge hoses 12 of pumps 10.

As is apparent from the exemplified embodiments shown in FIGS. 8-9 and 19-25, the various design features incorporated into the wear sleeves may be varied extensively and combined in various ways. It also will be appreciated that such design features are not limited to the preferred, exemplified embodiments. They are generally suited for use in other flowline components joined by flange unions. In any event, it will be appreciated that by incorporating wear sleeves as exemplified herein, erosion of the novel flowline components may be reduced. Service life of the components also may be increased by periodically replacing the wear sleeves.

Though the course of a particular flow line will vary greatly depending on the equipment used and the well site, it also will be appreciated that the novel flow lines may provide a single, relatively large flowline over much of the high-pressure side of a frac system. Flow line 100, for example, runs from pump discharges lines 12 all the way to well head 17. Such flow lines offer various advantages.

First, the overall layout at a well site is greatly simplified. Simplification of the frac system can create space to access other portions of the system and reduce confusion among workers at the site. Moreover, by replacing multiple lines with a single line, the total number of components in the system may be reduced. Fewer components mean fewer junctions and fewer potential leak and failure points in the system. Fewer components also means less assembly time at a well site.

Second, exposed elastomeric seals are a potential source of leaks. They also increase turbulence through a conduit and, therefore, erosion resulting from the flow of abrasive slurry through the flow line. The novel flow lines, however, preferably are assembled using flange unions. Flange unions do not have any exposed elastomeric seals. They have internal metal seals situated between the union faces. Thus, preferred block fittings, such as offset cross junctions 130 and angled shims 140, have union faces adapted for flange unions, and flow line 100 does not have any exposed elastomeric seals other than those that necessarily may be present in components such as control valves.

It will be noted in particular that preferred flow lines, such as flow line 100, are able to accommodate changes in direction without conventional directional fittings such as elbows, but especially without using swivel joints. Swivel joints are expensive. They incorporate elastomeric seals and packings. They also have sharp turns which are particularly susceptible to erosion. Moreover, they are particularly susceptible to bending stress caused by vibrations in the flow line. Such strain can lead to failure. In any event, it means that swivel joints have a relatively shorter service life than many flow line components. Thus, swivel joints not only are a big component of the overall cost of a flow line, but they are a primary source of potential leaks and failure.

The relatively large inner diameter of the novel flowlines such as flow line 100 can help minimize erosion and failure in other ways. As the diameter of a conduit increases, drag on the fluid passing through the conduit increases, but not as rapidly as the volume of fluid. Thus, proportionally there is less drag, and flow through the conduit is more laminar. Moreover, by replacing multiple smaller lines with a single larger line, overall drag on fluid conveyed through the system is reduced. For example, a single $7\frac{1}{16}$ line may replace six 3" lines. The drag through the larger line will be less than half the cumulative drag through the six smaller lines. More importantly, less drag means less erosion.

In addition, the novel flow lines, such as flow line 100, may incorporate more gradual changes in directions. Swivel joints and other conventional fittings have relatively sharp turns and changes in direction. The gradual turns of flow line 100, for example, will tend to reduce the angle of impingement of abrasive particles on the conduit walls. The flow line, therefore, will tend to suffer less brittle erosion.

Perhaps most importantly, the relatively large diameter of, and the more gradual turns in the novel flow lines such as flow line 100, may create the opportunity for on-site inspection. That is, there are various conventional systems which allow inspection of the inside of pipelines used to transport oil and gas. Such pipelines typically have larger internal diameters and fewer turns, especially sharp turns, than are present in frac systems. Such in-line inspection (ILI) systems include cameras which are deployed into a conduit to visually inspect the internal walls for defects. The capabilities of visual ILI systems may be enhanced by using penetrating dyes. Magnetic-flux leakage, magnetic particle, and electromagnetic acoustic transducer ILI systems also may be deployed to detect electromagnetic anomalies caused by corrosion and erosion. Pit gauges, calipers, or 3-D laser (LIDAR) systems also may be deployed to map the surface of the conduit.

Many of those systems and techniques are used to inspect components at off-site production or certification facilities. The use of conventional ILI systems on site, however, is extremely limited or nonexistent in conventional flow lines used in frac systems. Conventional frac systems typically employ too many relatively small flow lines having a relatively high number of relatively sharp turns. It is difficult or impossible to run conventional ILI equipment through much, if not all of the system.

By using a single, relatively large flow line with more gradual bends, however, various embodiments of the invention make such in-line inspection techniques possible. For example, flow line 100 has a single, relatively large diameter flow line running all the way from discharge lines 12 of pumps 10 to well head 17. Typically, flow line 100 will be made up of nominal $7\frac{1}{16}$" or $5\frac{1}{8}$" components having, respectively, inner diameters of 7.06" and 5.13". The bends in flow line 100 between hydraulic valve 51 and well head 17 are gradual. There are no 90° turns. Thus, many conventional in-line inspections systems may be run into flow line 100 as assembled at a well site.

The novel single line frac system preferably will be installed within and supported by a modular skid system. The skids are designed to restrict movement of flowline components if the union between the components fail. In addition, the skids are adjustable. Components carried within the skid may be adjusted along three axes to allow easy and precise positioning to facilitate assembly of the flow line. The skids are modular, and may be interconnected to facilitate transportation of the flow line in pre-assembled. subassemblies to the site.

A preferred embodiment 160 of the skids of the subject invention is shown in FIGS. 20-22. As shown therein, a flowline subassembly 101 has been loaded within skid 160. Subassembly 101 generally comprises two cross junctions 20 which are connected by a spool 30. Flanged female subs 71 of a hammer union sub are connected to feed union faces 27 of cross junctions 20. Subassembly 101 will be installed in flow line 100 as described further below.

Skid 160 generally comprises a base 161, a carriage 162, an assembly stand 163, a lift 164, and a cage 165. Base 161 is a rugged, heavy a frame-like structure comprising various lateral and cross members fabricated, for example, by welding steel tubing, bars, or other structural members together. It serves a primary purpose of providing a foundation for skid 160. Consistent with that purpose, it may have a variety of design configurations. Generally, it will have a frame-like structure, but it may be a solid plate. A base also may be provided by separate feet having a sufficiently large footprint to support the substantial weight of skid 160 and flowline subassemblies, such as subassembly 101.

Carriage 162 is illustrated as a plate-like part, but it can have a frame-like structure. It is supported on base 161 by four linear actuators 166. Preferably, linear actuators are hydraulic cylinders, and it will be appreciated that hydraulic lines and other conventional components of hydraulic systems have been omitted from FIGS. 26-28 for the sake of clarity. Frac sites are not always level or graded to specification. Actuators 166, therefore, preferably may be controlled by conventional control systems to level carriage 162. In any event, actuators 166 may be controlled to raise and lower carriage 162 over base 161 and, thereby, to raise and lower subassembly 101 relative to grade. It will be appreciated, however, that other linear actuators, such as electric motors, may be used if desired.

Carriage 162 also comprises bearing surfaces which allow subassembly 101 to be moved horizontally across carriage 162 along at least two intersecting axes so that subassembly 101 to be positioned anywhere on carriage 162. Subassembly 101 typically will be quite heavy, and therefore, the bearing surface should have a sufficiently low coefficient of friction so that subassembly 101 may be moved manually across carriage 162 by workers on site. Thus, for example, carriage 162 is provided with a plurality of ball transfer units 167 that allow free and easy movement of subassembly 101. A variety of conventional ball transfer units are known and commercially available and may be mounted to carriage 162 by conventional means. Raceways also may be machined into the bottom plate of carriage 162 and ball bearings packed therein. Other types of bearings may be provided as well. Given that subassembly 101 will be moved about carriage 162, carriage 162 preferably is provided with a rim, as seen best in FIG. 25, or tabs or some other interfering structure to limit movement of subassembly 101 across carriage 162.

Figure 26:
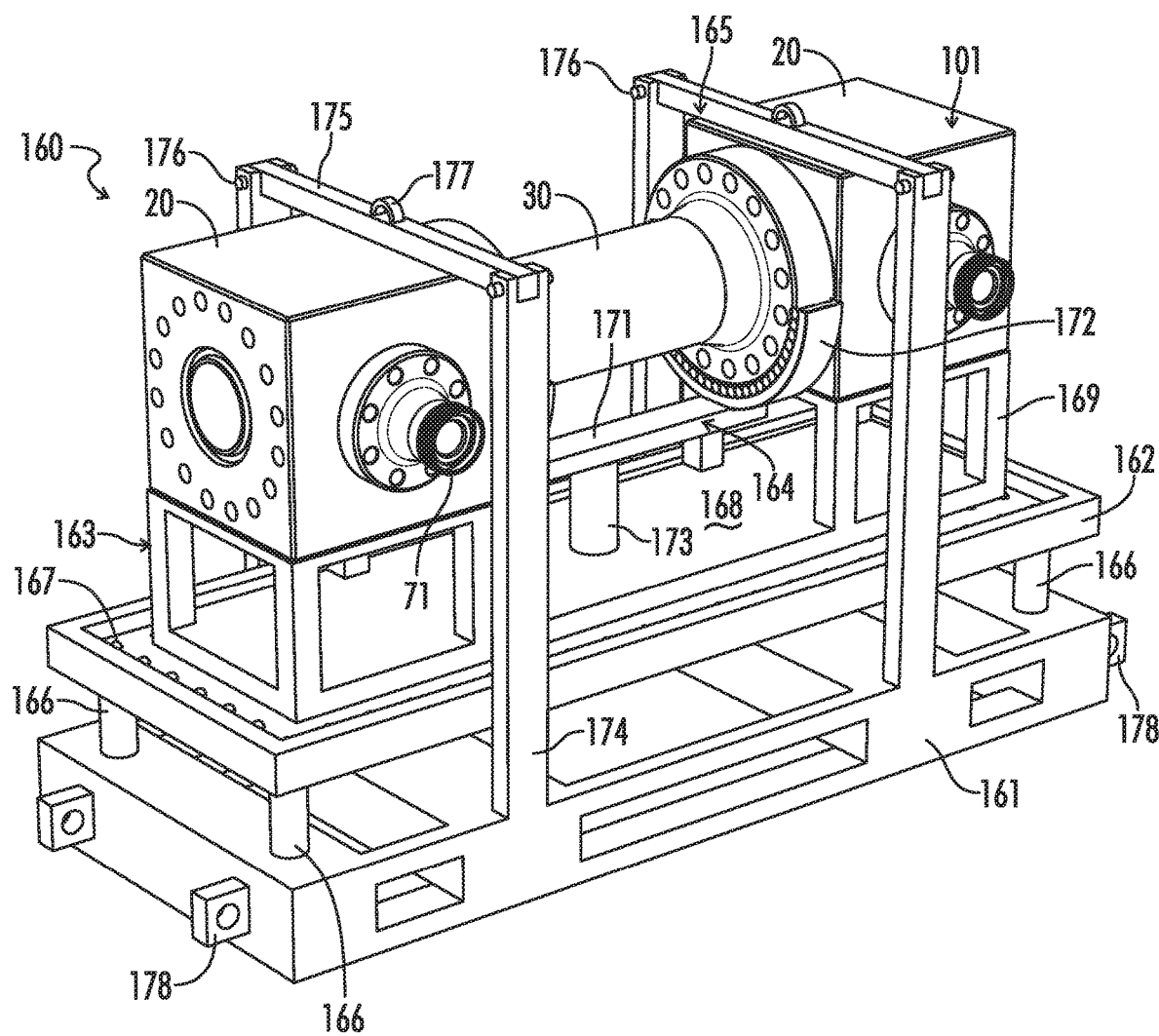
FIG. 26 is an isometric view of a first preferred embodiment 160 of the skids of the subject invention showing a flowline subassembly 101 supported thereon.

Subassembly 101 preferably, as seen best in FIG. 26, is supported on an assembly stand 163. Assembly stand 163 has a plate-like base 168 from which extend a pair of frame pedestals 169. Subassembly 101 is supported on pedestals 169 well above carriage 162.

Lift 164 comprises a beam 171 and a pair of semi-circular, conventional bearing races 172 mounted at each end thereof. Beam 171, as its name implies, is an elongated support member. It provides support or a base upon which bearing races 172 may be mounted. Thus, its precise design and configuration may be varied considerably. Bearing races 172 generally conform to and are aligned with the flanges on spool 30 so that, as described below, they may engage the flanges and support subassembly 101. Bearing races 172 may be, for example, needle roller bearings.

Figure 27:
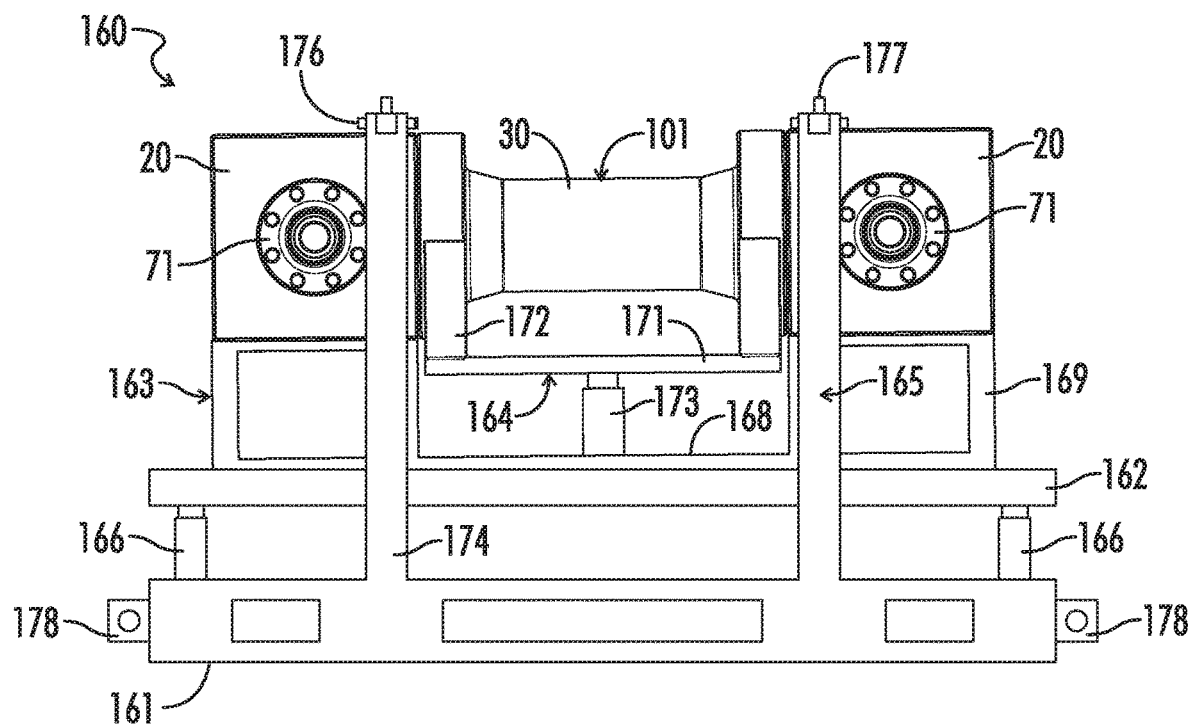
FIG. 27 is a side elevational view of skid 160 shown in FIG. 26.
Figure 28:
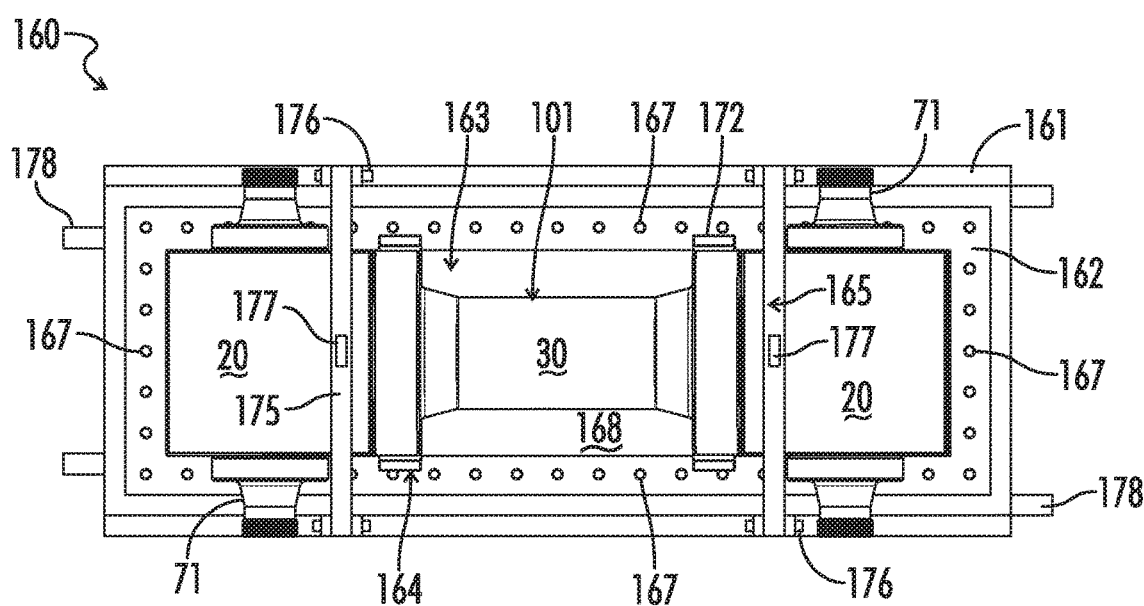
FIG. 28 is a top plan view of skid 160 shown in FIGS. 26-27.

Lift 164 also comprises a linear actuator 173. Linear actuator 173 is mounted between assembly stand base 168 and lift beam 171, and may be actuated to raise or lower lift 164 relative to assembly stand 163. It will be appreciated that as shown in FIGS. 26-27, lift 164 is in a lower position in which it is at least minimally below subassembly 100 on stand 163. More specifically, bearing races 172 preferably will be at least slightly below the flanges on spool 30. The weight of subassembly 101 thus will be supported by assembly stand 163 and unnecessary wear and tear on bearing races 172 will be avoided. When lift 164 is raised, however, bearing races 172 will engage the flanges of spool 30, allowing subassembly 101 to be lifted well above assembly stand 163. Subassembly 101 then may be rotated on bearing races 172.

Preferably, as does skid 160, the novel skids also will be provided with an upper cage which allows access to subassembly 101 but, in the event of severe, unexpected movement or disruption of flow line 100, will at least partially limit movement of subassembly 101 off and away from skid 160. Thus, cage 165 of skid 160 extends upward from base 161 and over subassembly 101. In particular, frame members 174 are connected to and extend vertically from base 161. Horizontal frame members 175 extend across the top ends of vertical frame members 174. Thus, cage 165 allows a substantial degree of freedom in adjusting the position of subassembly 101 within skid 160, but will significantly restrict violent movement of subassembly off of skid 160.

Horizontal frame members 175 preferably are releasably connected to vertical frame members 174. For example, vertical frame members 174 and horizontal frame members 175 may be provided with mating holes and secured together by pins 176. The releasable connection allows horizontal frame members to be temporarily disassembled from skid 160 to provide greater access to subassembly 101. For example, removing horizontal frame members 175 will allow subassembly 101 to be raised high enough to allow rotation of subassembly 101. At the same time, when assembled into skid 160, horizontal frame members 175 allow cage 165 to significantly restrict movement of subassembly off of skid 160.

Many other cage designs and configurations may be adopted, however, consistent with such purposes. For example, the horizontal frame members may curve over the top of subassembly 101. Horizontal and vertical are used in describing the cage feature because in large part straight frame members are more easily fabricated and assembled. The terms should be understood, however, as including frame members which extend over and on each side of a subassembly carried on the skid.

The novel skids preferably are modular, and thus will be provided with features which facilitate transportation of the skids and assembly with other skids. Skid 160, for example, is provided with loading ears 177 on horizontal frame members 175. Loading ears 177 allow a lift to connect to, pick up, and move skid 160 about as required to transport skid 160 to and from a site and to assemble and disassemble flow line 100. Skid 160 also has connection tabs 178 extending laterally away from base 161. Connection tabs 178 are provided with holes. Thus, skids 160 may be assembled together by aligning tabs 178 with tabs 178 on an adjacent skid 160, and inserting a retaining pin (not shown) in the holes. Tabs 178 and pins provide a simple, reliable system for easily coupling and uncoupling a series of skids, but other designs may be used. Similarly, skids 160 may be connected via linkages, including linkages which may be adjustable to accommodate variation in the relative positions of the skids.

It will be appreciated, therefore, that skids 160 can allow flow line 100 to be assembled more efficiently, effectively, and at lower overall cost. Like any conventional skid system, skids 160 allow most components of flow line 100 to be assembled into subassemblies off site. Assembly of the components may be managed, controlled, and systemized more easily in an off-site facility, and usually much closer to specification. Unlike many conventional skid systems, however, the novel systems allow for easy assembly of the flow line on site.

Flow line 100, for example, may be designed off site to meet the requirements of a particular fracturing system and operation. The required parts will be determined as will the layout of flow line 100. Most of the required components, such as offset cross junctions 120, spools 30, angled shims 140, and offset spools 130, then may be assembled into subassemblies and loaded onto skids 160. Once transported to the site, skids 160 will be laid out generally in the required order, but they do not have to be located with a high degree of precision. Even with modern lifting equipment, that is a difficult task. Skids 160, however, allow subassembly 101 to be adjusted in any direction. It may be leveled, raised, lowered, and moved across carriage 162 as needed to make up flow line 100.

As noted previously, skid 160 also allows flowline subassemblies to be rotated. Erosion and general wear is not symmetrically distributed through a flow line. The bottom portions of a flow line will experience greater wear over its service life than the upper portions. Thus, the novel skids, such as skid 160, will allow a flow line to be rotated periodically without disassembling the entire flow line. Erosion may be distributed more evenly through the components, thus allowing the service life of the components to be extended.

It will be appreciated, of course, that the novel skids provide additional advantages in applying the novel flow lines and components. They may be used, however, in the context of conventional flow lines. Similarly, the novel flow lines and components have been described in the context of frac systems. While frac systems in particular and the oil and gas industry in general rely on temporary flow lines, the novel unions are not limited to such applications or industries. Suffice it to say that the novel flow lines and components have wide applicability in those fluid transportation systems where temporary flow lines have been conventionally applied.

While this invention has been disclosed and discussed primarily in terms of specific embodiments thereof, it is not intended to be limited thereto. Other modifications and embodiments will be apparent to the worker in the art.

What is claimed is:

1. A flowline component adapted for assembly into a high-pressure fluid transportation system, said flowline component comprising:
   (a) a body defining a substantially cylindrical central conduit, said conduit extending between first and second union faces and adapted to conduct fluids through said body;
   (b) said union faces being adapted to provide a mating surface for a flange union between said component and another flowline component;
   (c) said union faces having a plurality of holes adapted to accommodate threaded connectors for forming said flange union; and
   (d) said holes being arranged in a defined array extending angularly around said conduit;
   (e) wherein said array of holes on said first union face and said array of holes on said second union face are offset angularly relative to each other by an angle Δ.

2. The flowline component of claim 1, wherein said arrays of holes comprise 16 holes spaced angularly at 22.5° and said offset angle Δ is 11.25° or 7.5°.

3. The flowline component of claim 1, wherein said arrays of holes comprise 12 holes spaced angularly at 30° and said offset angle Δ is 15° or 10°.

4. The flowline component of claim 1, wherein said arrays of holes comprise 8 holes spaced angularly at 45° and said offset angle Δ is 22.5° or 15°.

5. The flowline component of claim 1, wherein said component is a pipe having flanges and said flanges on said pipe provide said union faces and said holes accommodate the passage of said threaded connectors through said flange.

6. A flow line for a high-pressure fluid transportation system, said flow line comprising the flowline component of claim 5 assembled into said flow line by flange unions.

7. A high-pressure fluid transportation system, said system comprising the flow line of claim 6.

8. The high-pressure fluid transportation system of claim 7, wherein said system is a frac system.

9. The high-pressure fluid transportation system of claim 7, wherein said system is a frac system comprising:
   (a) a plurality of pumping units each having discharge lines;
   (b) a well head; and
   (c) a single said flow line connected to each of said pump discharge lines and to said well head, whereby all fluid discharged from said pumps is conveyed by said single flow line to said well head.

10. The flowline component of claim 1, wherein said component is a block fitting and said holes are bottomed holes accommodating engagement with said threaded connectors.

11. A flow line for a high-pressure fluid transportation system, said flow line comprising the flowline component of claim 1 assembled into said flow line by flange unions.

12. A high-pressure fluid transportation system, said system comprising the flow line of claim 11.

13. The high-pressure fluid transportation system of claim 12, wherein said system is a frac system comprising:
   (a) a plurality of pumping units each having discharge lines;
   (b) a well head; and
   (c) a single said flow line connected to each of said pump discharge lines and to said well head, whereby all fluid discharged from said pumps is conveyed by said single flow line to said well head.

14. The high-pressure fluid transportation system of claim 13, wherein said well head comprises a zipper manifold.

15. The high-pressure fluid transportation system of claim 12, wherein said system is a frac system.

16. A method of assembling a flow line for a high-pressure fluid transportation system, said method comprising assembling the flowline component of claim 1 into said flow line by connecting said flowline component to other flowline components by a flange union.

17. A directional flowline fitting, said fitting being adapted for assembly into a flowline segment providing a single conduit in a fluid transportation system to provide a change of direction in said single-conduit segment; said fitting comprising:
   (a) a prismatic body having a single conduit therein consisting of first and second intersecting straight line bores, said first bore providing an inlet and said second bore providing an outlet;
   (b) said bores extending from, respectively, a first union face and a second union face on said body, said union faces being adapted for connection to a flowline component by a flange union;
   (c) wherein the extended planes of said first and second union faces intersect at an interior angle θ less than approximately 90°.

18. The flowline fitting of claim 17, wherein said angle θ is approximately 45° or approximately 60°.

19. A flowline segment providing a single conduit in a high-pressure fluid transportation system, said single-conduit segment comprising the fitting of claim 17 assembled into said single-conduit segment by flange unions, whereby said single-conduit segment is provided with a change of direction greater than 90°.

20. A high-pressure fluid transportation system, said system comprising the single-conduit flowline segment of claim 19.

21. The high-pressure fluid transportation system of claim 20, wherein said system is a frac system comprising:
   (a) a plurality of pumping units each having discharge lines;
   (b) a well head; and
   (c) a single flow line incorporating said single-conduit flowline segment and connected to each of said pump discharge lines and to said well head, whereby all fluid discharged from said pumps is conveyed by said single flow line to said well head and said single-conduit flowline segment provides a change in direction of said flowline.

22. The frac system of claim 21, wherein said single flow line does not comprise a swivel joint.

23. A method of assembling the flow line for a high-pressure fluid transportation system, said method comprising assembling a flowline segment of claim 17 into said flow line.

24. The flowline fitting of claim 17, wherein said body is a truncated solid rectangle.

25. A flowline segment providing a single conduit in a high-pressure fluid transportation system, said single-conduit segment comprising the fitting of claim 24 assembled into said single-conduit segment by flange unions, whereby said single-conduit segment is provided with a change of direction greater than 90°.

26. A high-pressure fluid transportation system, said system comprising the single-conduit flowline segment of claim 25.

27. The high-pressure fluid transportation system of claim 26, wherein said system is a frac system.

28. The high-pressure fluid transportation system of claim 26, wherein said system is a frac system comprising:
   (a) a plurality of pumping units each having discharge lines;
   (b) a well head; and
   (c) a single flow line incorporating said single-conduit flowline segment and connected to each of said pump discharge lines and to said well head, whereby all fluid discharged from said pumps is conveyed by said single flow line to said well head and said single-conduit flowline segment provides a change in direction of said single flow line.

29. A flowline segment providing a single conduit in a high-pressure fluid transportation system, said single-conduit segment having a change in direction and comprising:
   (a) an offset component assembled into said segment by flange unions, said offset component comprising:
      i) a body defining a substantially cylindrical central conduit, said conduit extending between first and second union faces and adapted to conduct fluids through said body;
      ii) said union faces having a plurality of holes accommodating threaded connectors for said flange unions; and
      iii) said holes being arranged in a defined array extending angularly around said conduit;
      iv) wherein said array of holes on said first union face and said array of holes on said second union face are offset angularly relative to each other by an angle $\Delta$; and
   (b) a directional fitting assembled into said segment by flange unions, said directional fitting comprising:
      i) a prismatic body having a single conduit therein consisting of first and second intersecting straight line bores; and
      ii) said bores extending perpendicularly from a first union face and a second union face on said body;
      iii) wherein the extended planes of said first and second union faces intersect at an interior angle $\theta$ less than approximately 90°.

* * * * *